(12) United States Patent
Suzuki et al.

(10) Patent No.: US 9,445,039 B2
(45) Date of Patent: Sep. 13, 2016

(54) FLAT-SCREEN DISPLAY DEVICE

(71) Applicant: SHARP KABUSHIKI KAISHA, Osaka-shi, Osaka (JP)

(72) Inventors: Yohei Suzuki, Osaka (JP); Daisaku Kiguchi, Osaka (JP); Harutaka Uno, Osaka (JP); Ryuji Hanao, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/767,672

(22) PCT Filed: Feb. 28, 2014

(86) PCT No.: PCT/JP2014/055060
§ 371 (c)(1),
(2) Date: Aug. 13, 2015

(87) PCT Pub. No.: WO2014/133131
PCT Pub. Date: Sep. 4, 2014

(65) Prior Publication Data
US 2016/0006973 A1    Jan. 7, 2016

(30) Foreign Application Priority Data

Feb. 28, 2013 (JP) ................................ 2013-038515
Feb. 28, 2013 (JP) ................................ 2013-038535

(51) Int. Cl.
*H04N 5/64* (2006.01)
*H04R 5/02* (2006.01)
*H04R 1/02* (2006.01)

(52) U.S. Cl.
CPC .............. *H04N 5/642* (2013.01); *H04R 1/028* (2013.01); *H04R 5/02* (2013.01); *H04R 2499/15* (2013.01)

(58) Field of Classification Search
CPC ... H04N 5/642; H04R 1/028; H04R 2499/15
USPC ......... 348/794, 790, 836, 787, 789; 381/386
See application file for complete search history.

(56) References Cited

U.S. PATENT DOCUMENTS 8,295,534 B2 * 10/2012 Hamada ................ G06F 1/1605
                                                                381/333
2008/0159570 A1    7/2008 Hung et al.
2011/0211719 A1    9/2011 Okumura
2013/0004006 A1    1/2013 Onogi

FOREIGN PATENT DOCUMENTS

JP          2009-118121 A      5/2009
JP          2010-11193 A       1/2010

(Continued)

*Primary Examiner* — Paulos M Natnael
*Assistant Examiner* — Jean W Desir
(74) *Attorney, Agent, or Firm* — Birch, Stewart, Kolasch & Birch, LLP

(57) ABSTRACT

There has been a need for a technology for effectively realizing a narrow frame in a flat-screen display device including a speaker. A liquid crystal television is provided with SP bosses (30) for attaching a speaker unit (50) to a bottom cover (20) which also serves as an appearance part. In addition, the speaker unit (50) is arranged onto a backlight chassis (12) (rear side). By arranging the speaker unit (50) and anchoring with a screw (81) so as to cause fixation holes of SP fixation portions (53) and holes of the SP bosses (30) to coincide, the speaker unit (50) is fixed to the bottom cover (20).

4 Claims, 30 Drawing Sheets

(56) References Cited

FOREIGN PATENT DOCUMENTS

| | | |
|---|---|---|
| JP | 2010-226648 A | 10/2010 |
| JP | 2010-239249 A | 10/2010 |
| JP | 2011-77637 A | 4/2011 |
| JP | 2011-160319 A | 8/2011 |
| JP | 2011-182035 A | 9/2011 |
| JP | 2012-4692 A | 1/2012 |
| JP | 2013-12869 A | 1/2013 |
| JP | 2013-38515 A | 2/2013 |

* cited by examiner

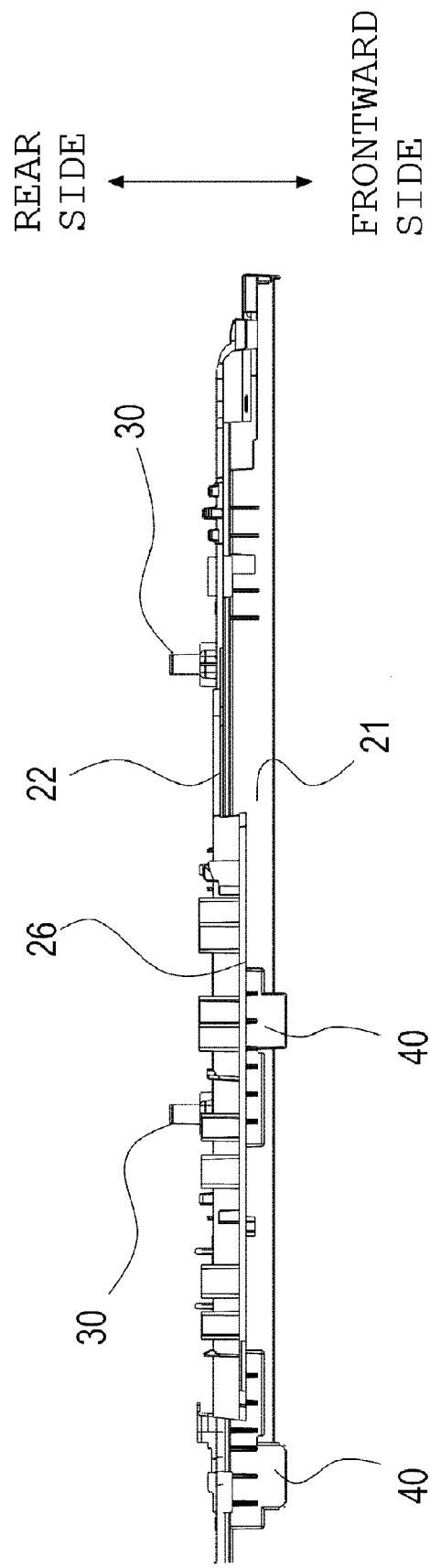

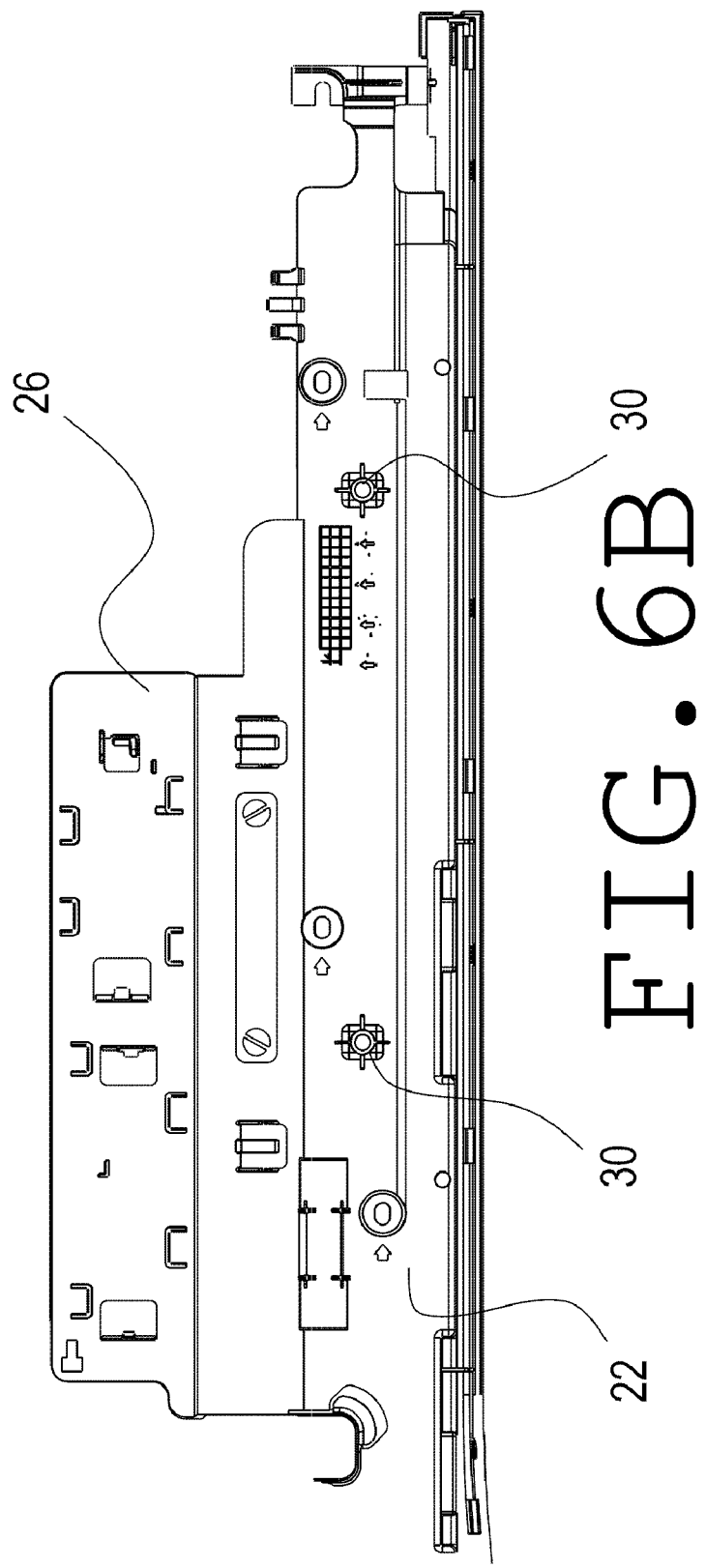

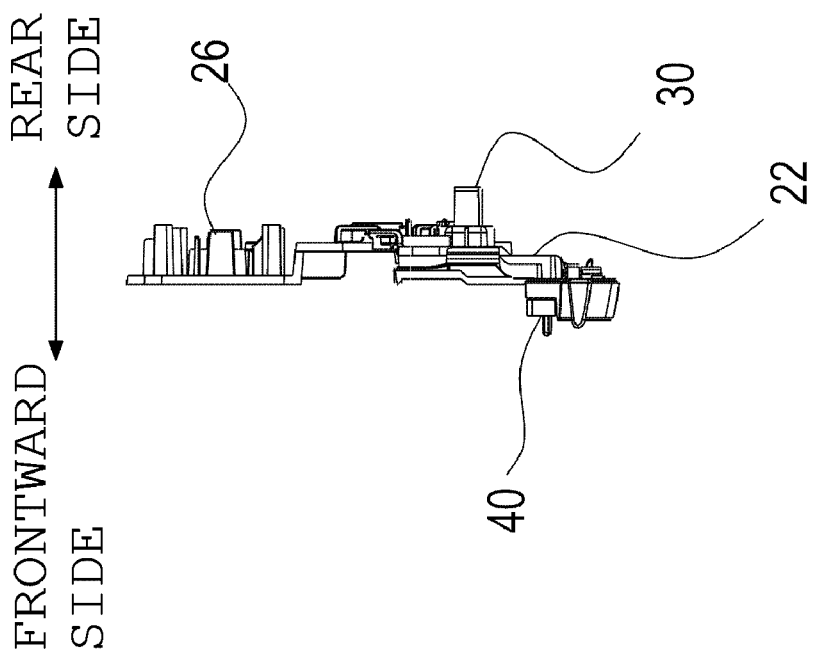

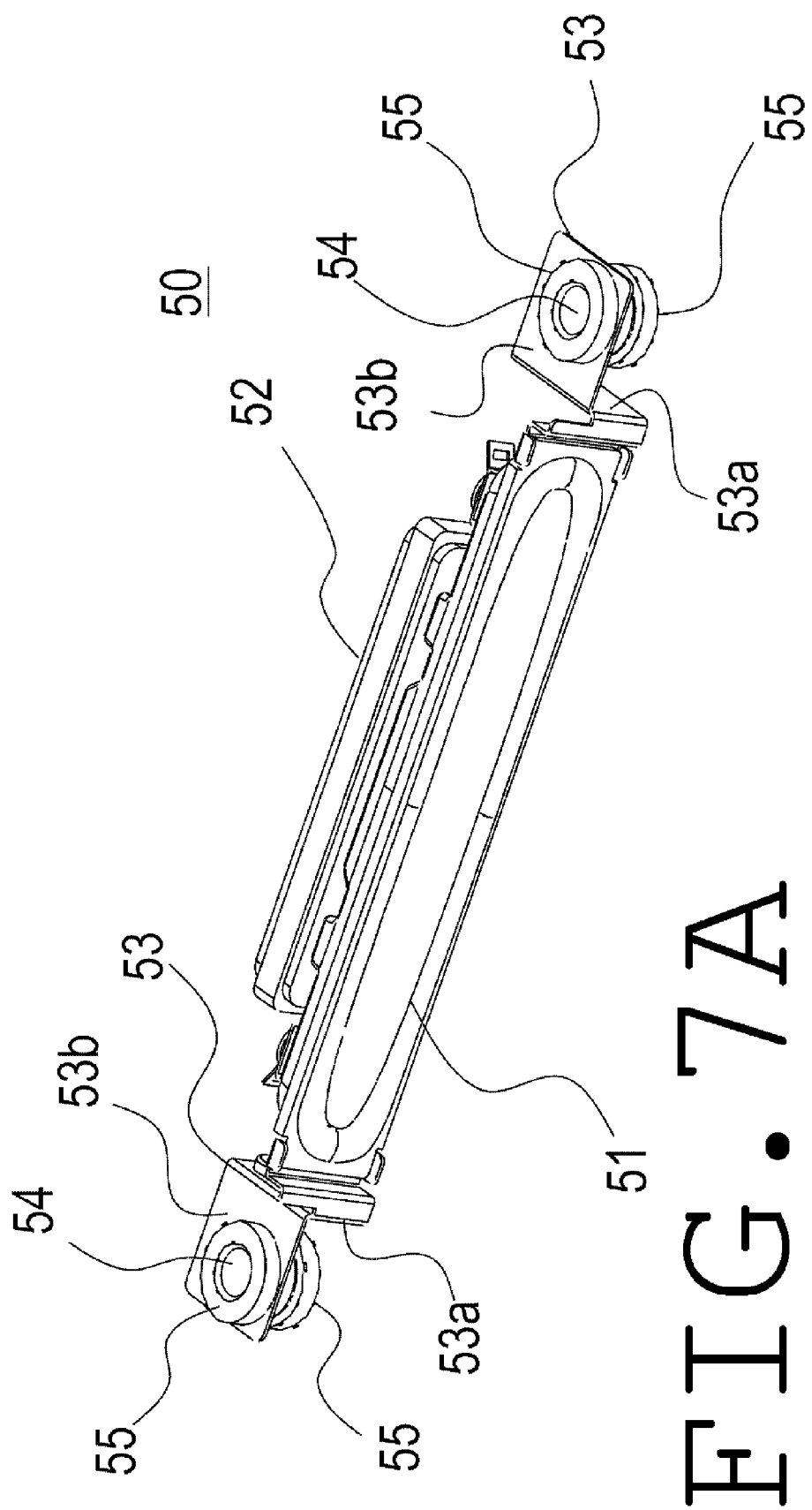

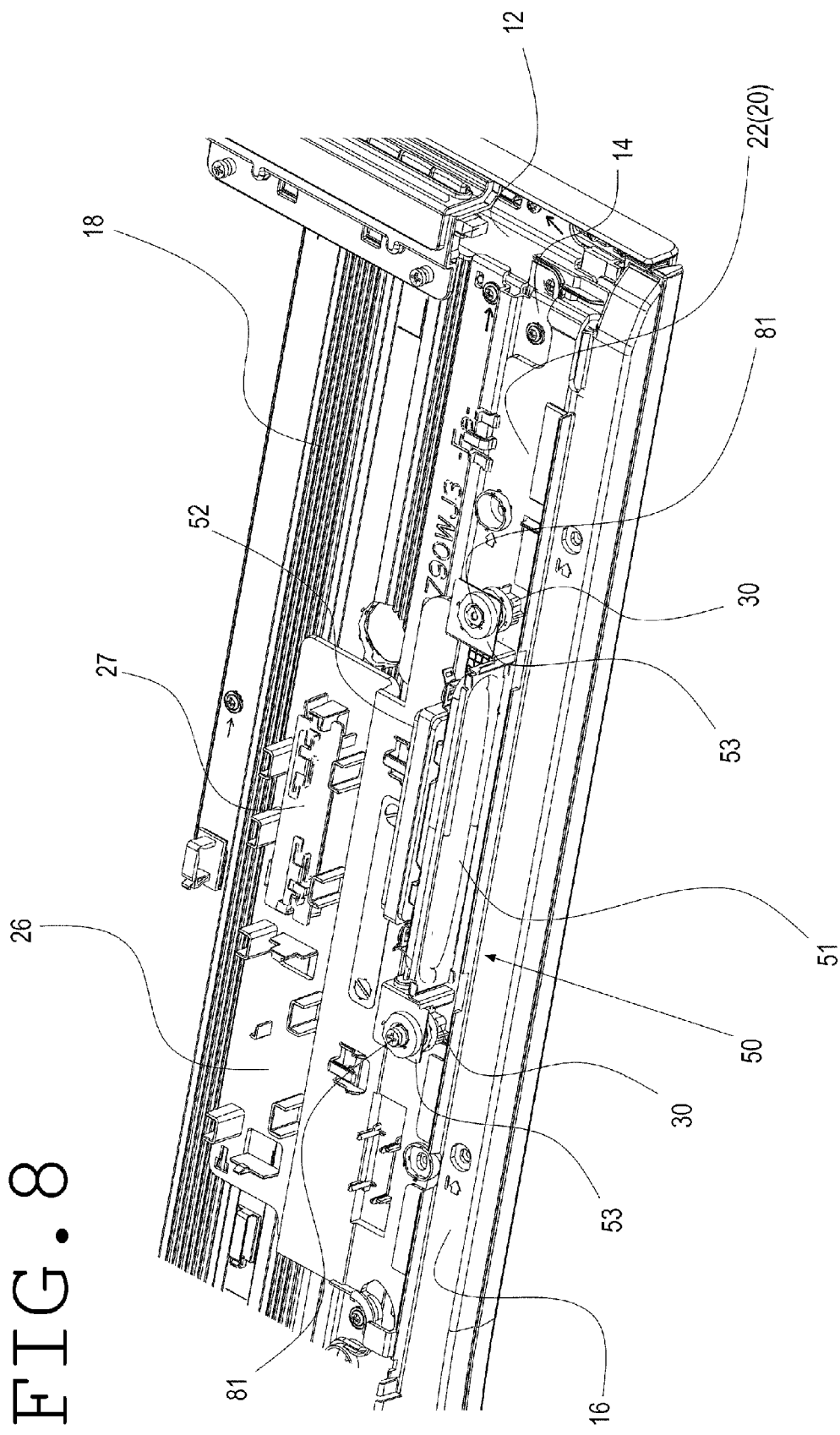

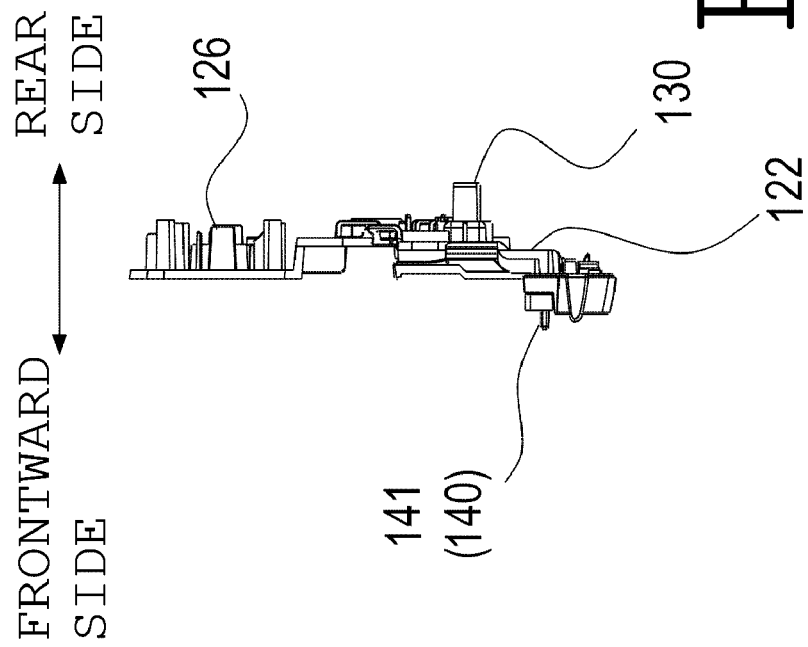

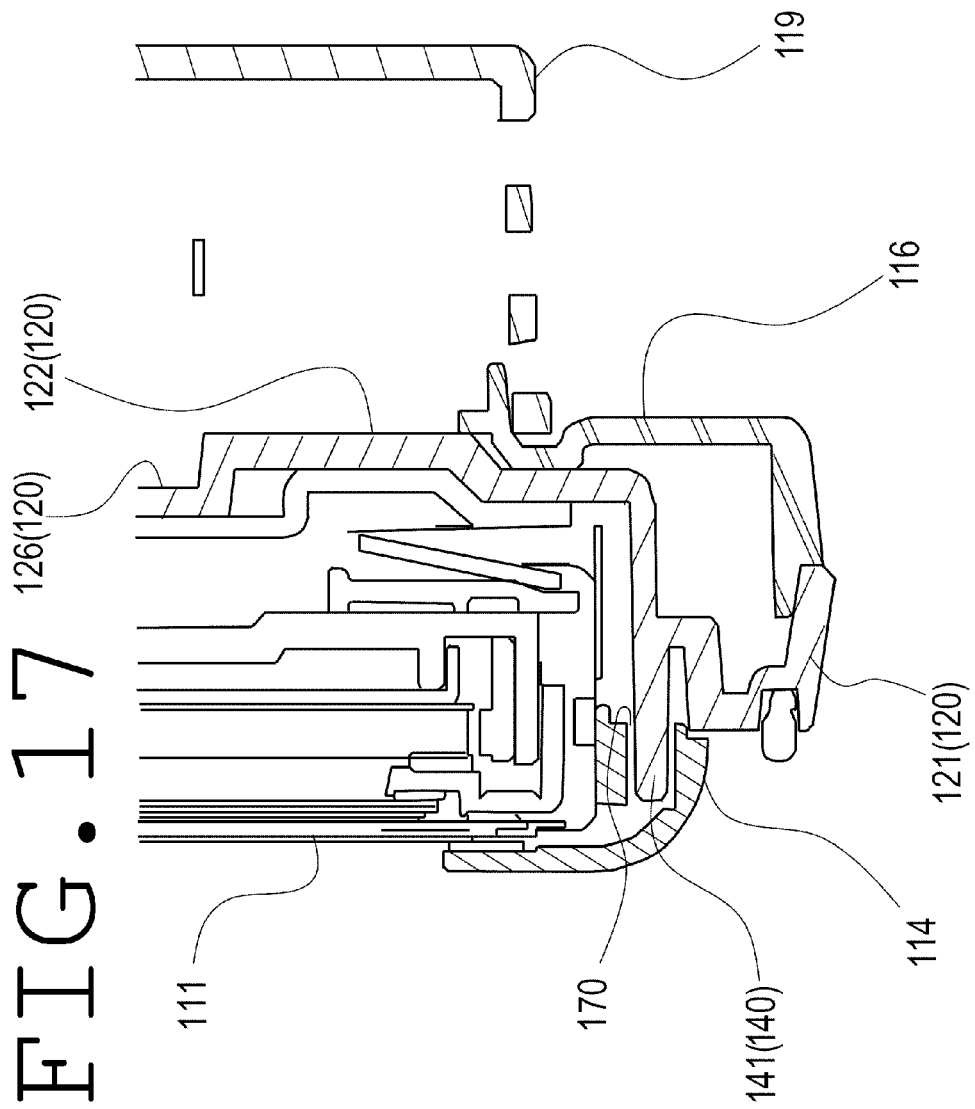

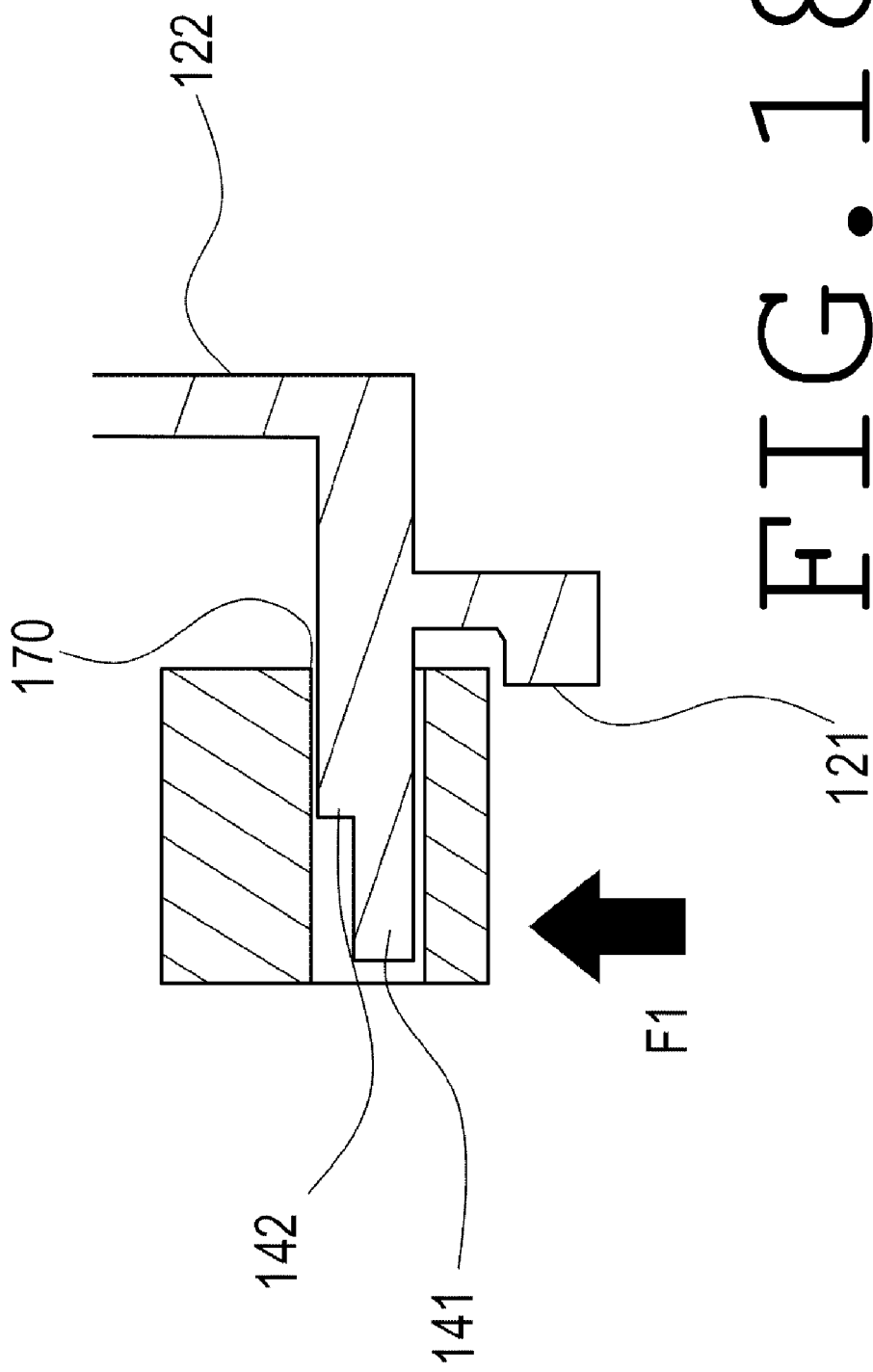

FLAT-SCREEN DISPLAY DEVICE

TECHNICAL FIELD

The present invention relates to a flat-screen display device provided with a speaker.

BACKGROUND ART

As to flat-screen televisions in these years, a narrow-frame model is becoming a mainstream, and this tendency is particularly strong among high-grade ones. Therefore, a structure in which functional parts are able to be arranged without widening a frame of a front cabinet has been desired.

One of the functional parts to be considered as such a structure is a speaker (speaker unit). As a structure of attachment of a speaker, various technologies have been proposed. For example, a flat-screen display device to audibly improve sound quality of a speaker in a low-cost structure has been proposed (for example, refer to PATENT LITERATURE 1).

Specifically, in the flat-screen display device, a liquid crystal module is fixed on a stand and a pair of speakers are arranged downward in a lower portion in a cabinet covering the liquid crystal module. Moreover, a stand cover of the stand is configured by a wide-plate-shaped base portion and an erected portion which is formed integrally so as to project on the base portion. Then, a front surface of the erected portion is set as a reflective surface which is inclined backward at a predetermined upward angle α to face the speaker, and the reflective surface is set to reflect a tone sounded from the speaker forward.

CITATION LIST

Patent Literature

PATENT LITERATURE 1: Japanese Laid-Open Patent Publication No. 2010-226648

SUMMARY OF INVENTION

Technical Problem

Meanwhile, in order to realize a narrow frame, a contrivance to prevent increase in a frame dimension which results from attachment of a speaker unit or the like is necessary. Moreover, in order to arrange a speaker on a rear surface of a television, installation of a shaft for attaching the speaker in a backlight chassis is also considered, but, when the shaft is installed, versatility of the backlight chassis is lost. Thus, a contrivance to attach the speaker to a rear surface of the backlight chassis has been desired.

In the technology disclosed in PATENT LITERATURE 1, the speaker is arranged under a display portion, so that improvement is required from a viewpoint of realizing the narrow frame, and thus another technology has been desired. Particularly, in the case of a large-sized display device, a speaker to be attached also tends to be large, so that a technology for arranging the speaker effectively has been desired.

The present invention is made in view of the circumstances above, and aims to provide a technology which solves the aforementioned problems.

Solution to Problem

A flat-screen display device of the present invention includes: a bottom cover which is arranged so as to cover a lower-side part of a display panel; and a speaker which is attached to the bottom cover and which is arranged in a region of a rear surface of the display panel with an output direction thereof downward and outward.

Moreover, the bottom cover may include a rear surface arrangement portion which is arranged in the rear surface of the display panel and in which bosses with which the speaker is attached are formed.

Moreover, the bosses of the bottom cover may be formed in two pieces with respect to one speaker to be attached so as to be perpendicular to the display panel, and in the speaker, a speaker main body may be formed in a shape having a longitudinal direction and a lateral direction as well as fixation portions for fixing the bosses may be formed in both ends in the longitudinal direction of the speaker main body and so as to be at a center position of the lateral direction.

Moreover, the fixation portions may be at higher positions than a center of gravity of the speaker.

Moreover, a rear cabinet which covers the speaker may be included.

Moreover, the rear cabinet includes an opening for output of the speaker.

Advantageous Effect of Invention

According to the present invention, it is possible to provide a technology of realizing a narrow frame in a flat-screen display device provided with a speaker.

BRIEF DESCRIPTION OF DRAWINGS

FIG. 6 are partial enlargement views of the bottom cover according to the first embodiment.

FIG. 8 shows a structure of attachment of the bottom cover according to the first embodiment, which is a view showing a region A1 of FIG. 1 by enlargement.

FIG. 17 is a sectional view showing a structure of connection of a cover rib of the bottom cover and a bottom cover attachment opening of an aluminum frame according to the second embodiment.

DESCRIPTION OF EMBODIMENTS

Description will be specifically given for forms for implementing the present invention (hereinafter, simply referred to as "embodiments") with reference to drawings. Note that, the present embodiment exemplifies a liquid crystal television as a display device, which is applicable additionally to a flat-screen display device such as an organic EL television.

First Embodiment

Figure 1:
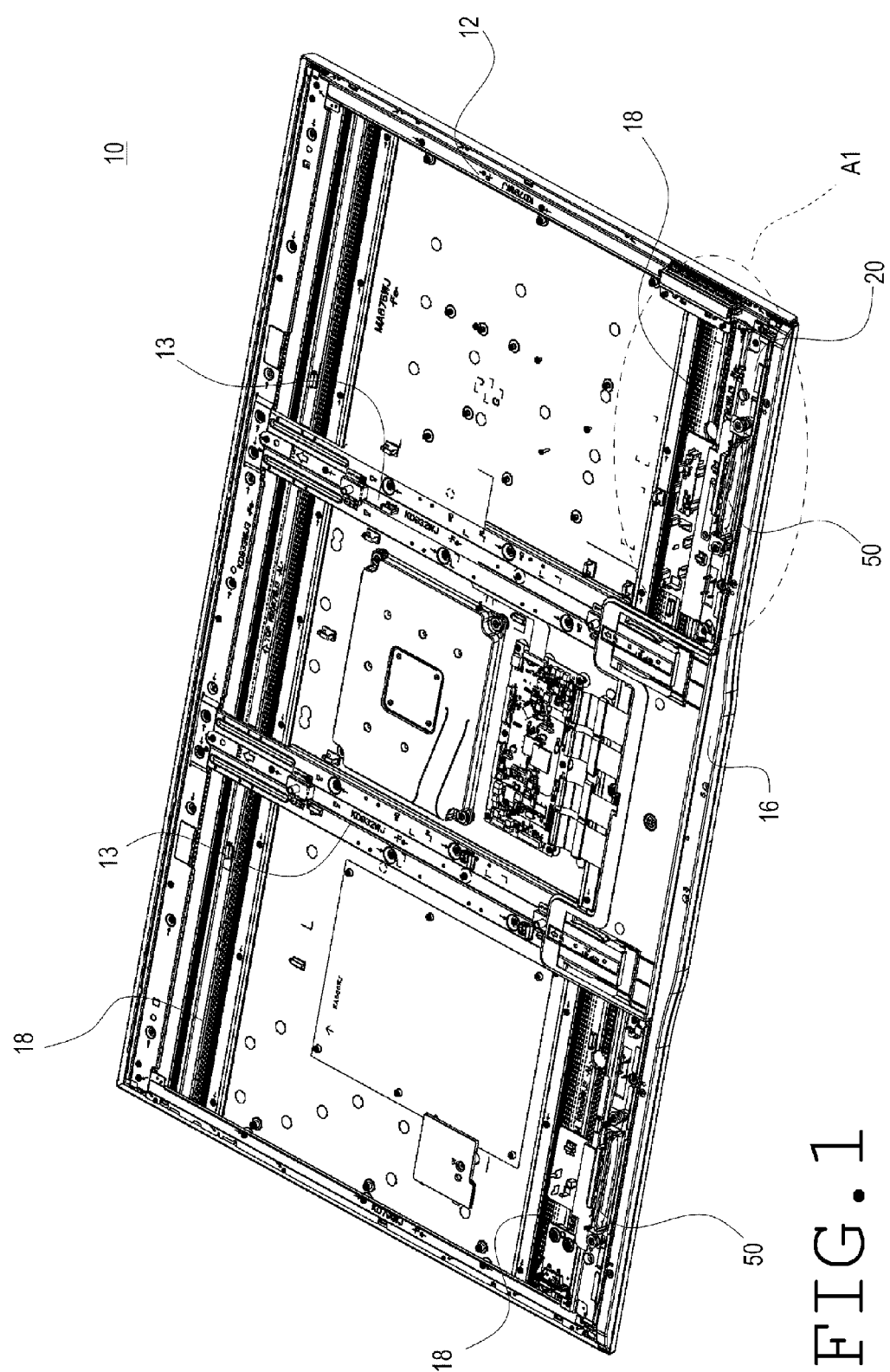
FIG. 1 is a perspective view of a rear surface of a liquid crystal television according to a first embodiment.
Figure 2:
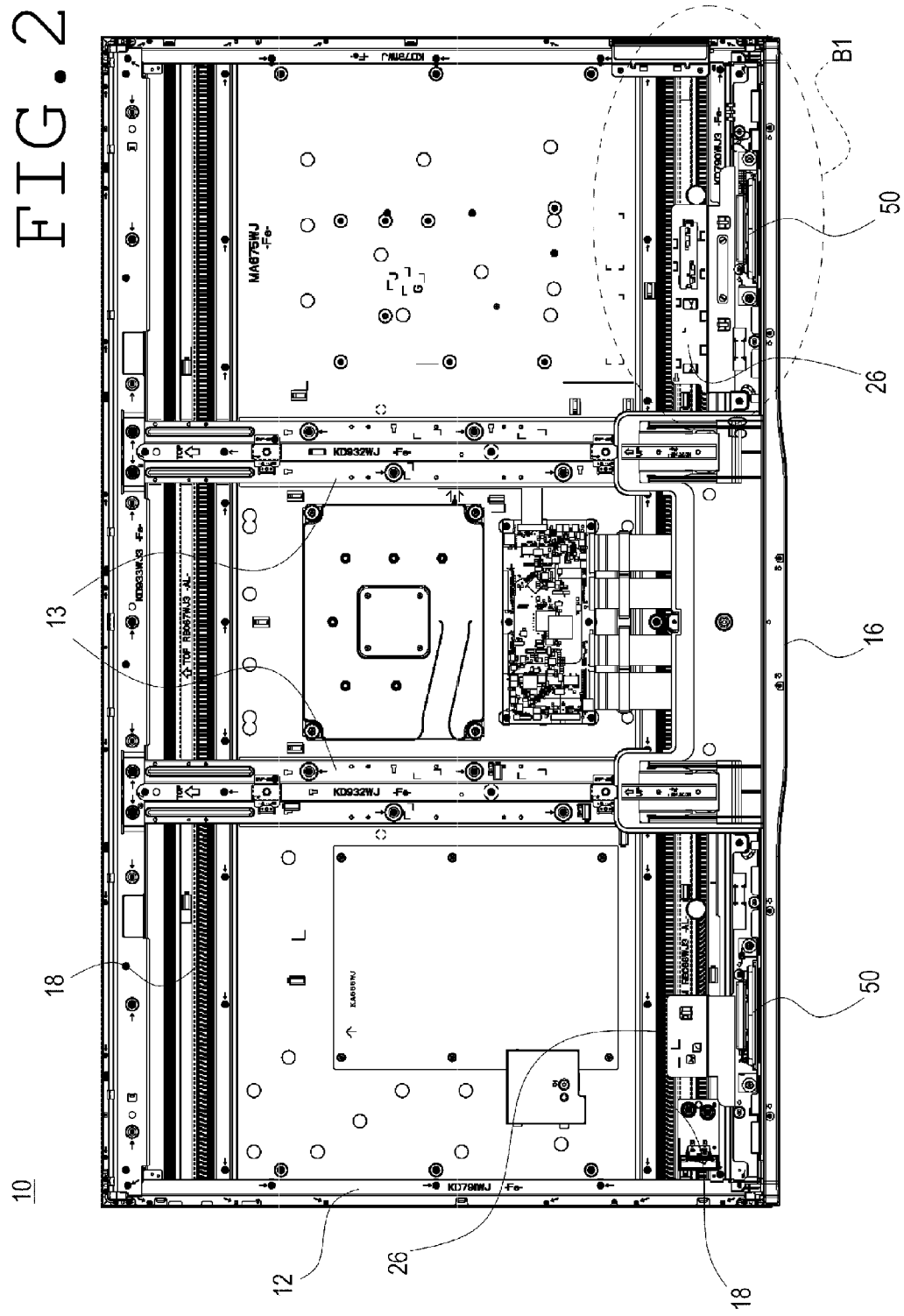
FIG. 2 is a view of the rear surface of the liquid crystal television according to the first embodiment.
Figure 3:
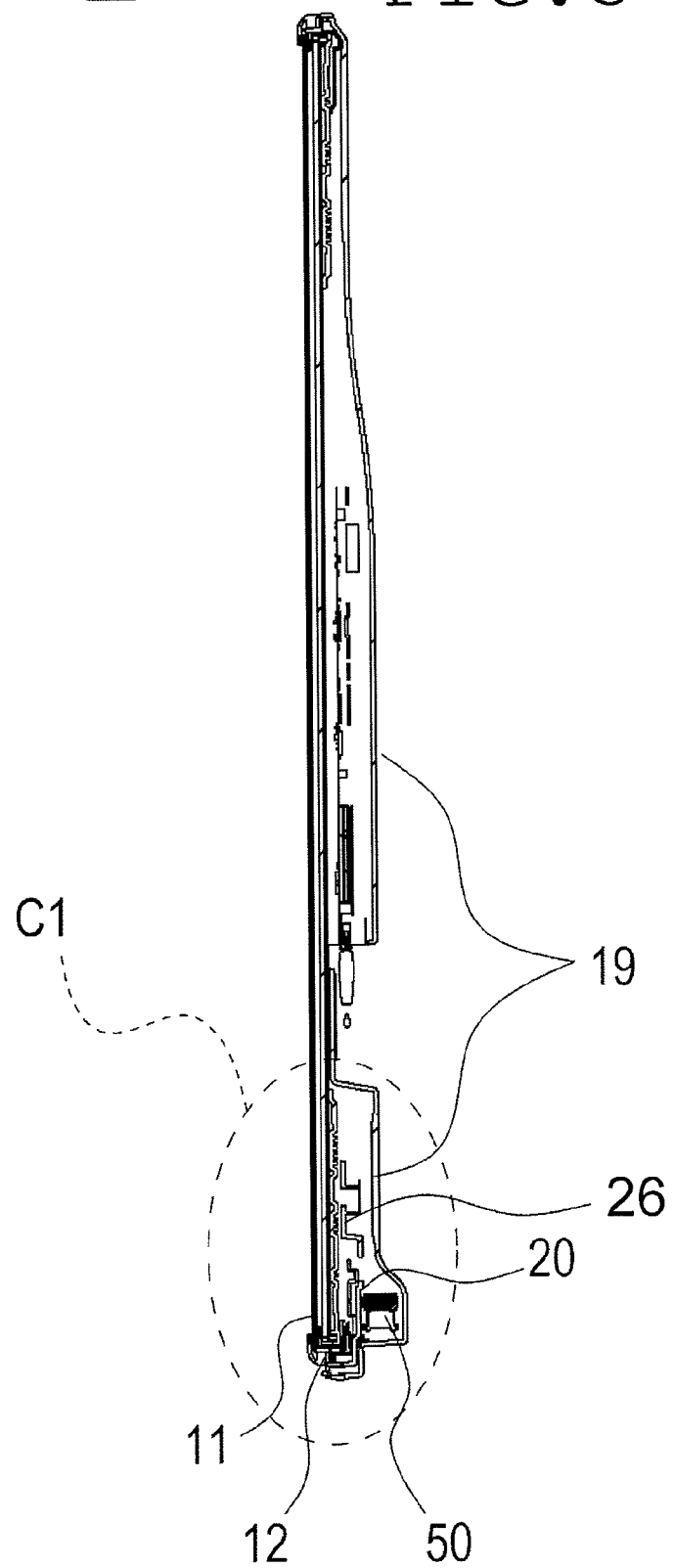
FIG. 3 is a sectional view of a side surface of the liquid crystal television according to the first embodiment.

FIG. 1 is a perspective view of a rear surface of a liquid crystal television 10 according to the present embodiment, FIG. 2 is a view of the rear surface of the liquid crystal television 10, and FIG. 3 is a sectional view of a side surface thereof. Note that, FIG. 1 and FIG. 2 show an inner structure so as to be recognizable by removing a rear cover 19. As illustrated, in the rear surface of the liquid crystal television 10, a backlight chassis 12 is exposed in a state where the rear cover 19 is detached, and two reinforcing angles 13 are arranged in a vertical direction.

In this liquid crystal television 10, SP bosses with which a speaker unit 50 is attached to a bottom cover 20 which also serves as an appearance part are provided. Moreover, the speaker unit 50 is arranged onto the backlight chassis 12 (rear side). By adopting such a configuration, frame narrowing of the liquid crystal television 10 is realized.

Figure 4:
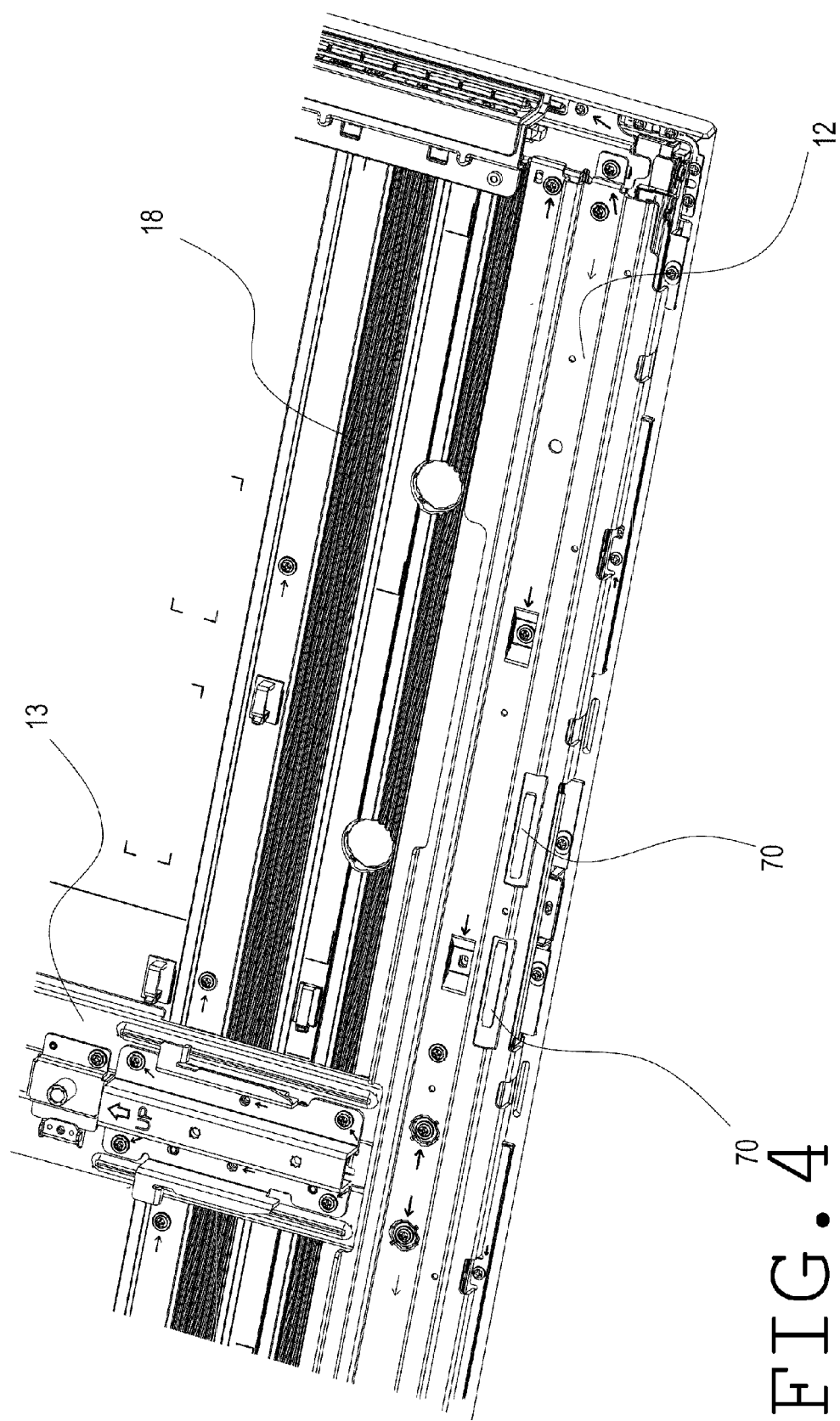
FIG. 4 is a partial enlargement perspective view of a backlight chassis of the liquid crystal television according to the first embodiment.

FIG. 4 shows a region of a lower right part of the backlight chassis 12 in a rear view (region corresponding to a region A1 of FIG. 1 and a region B1 of FIG. 2). The backlight chassis 12 includes an aluminum frame 14 as an outer frame structure of a display panel 11. Then, in a region of a lower side of the aluminum frame 14, bottom cover attachment openings 70 with which the bottom cover 20 is attached from the rear side are provided.

The bottom cover attachment openings 70 have a rectangular shape whose right-and-left direction serves as a longitudinal direction, and are arrayed in two pieces in each of right and left of the aluminum frame 14 to be formed in four pieces in total. Into the bottom cover attachment openings 70, cover ribs 40 of the bottom cover 20, which will be described below, are inserted. That is, the shape of the bottom cover attachment openings 70 is set so as to have a shape in accordance with a shape of the cover ribs 40.

Figure 5A:
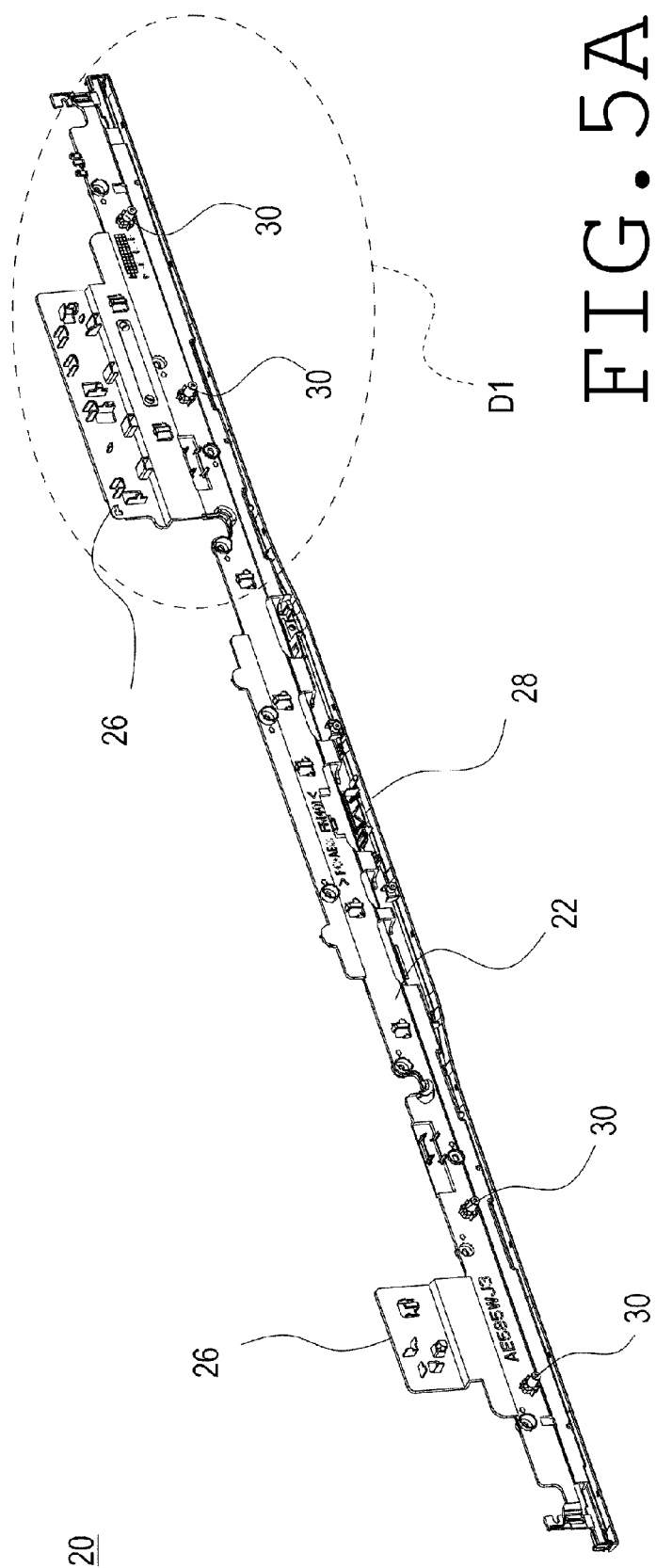
FIG. 5 are perspective views of a bottom cover according to the first embodiment.
Figure 5B:
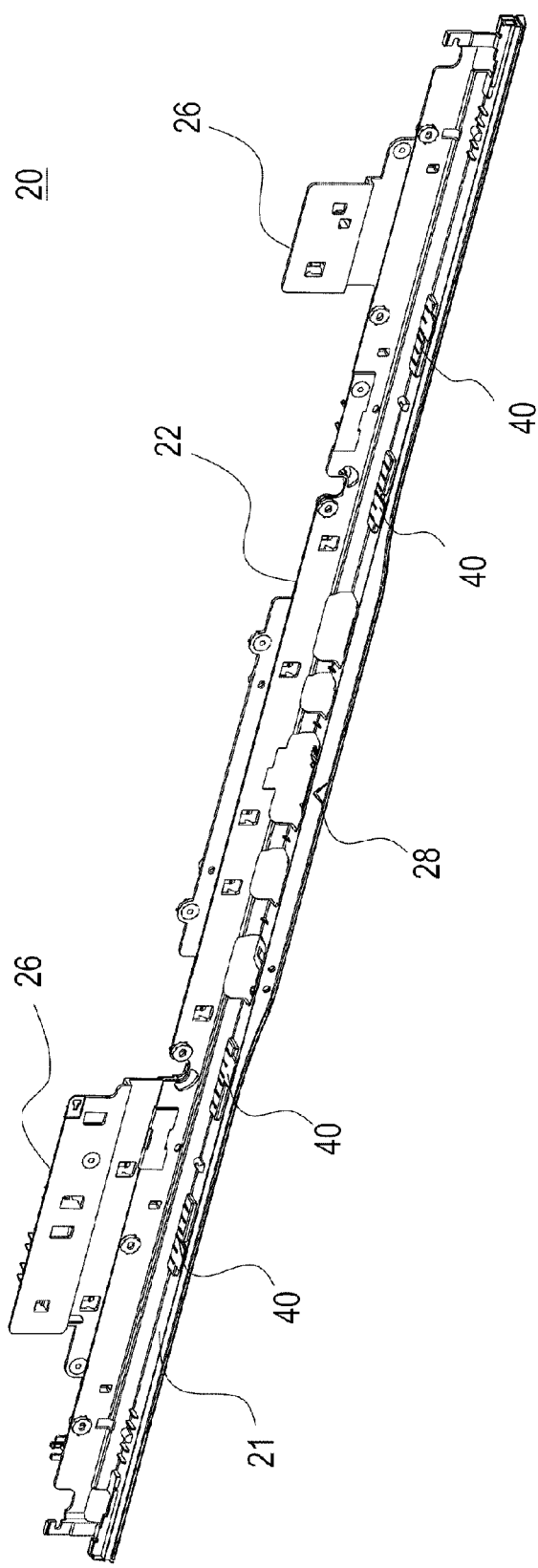

FIG. 5 are perspective views of the bottom cover 20, in which FIG. 5A is the perspective view when viewed from the rear side and FIG. 5B is the perspective view when viewed from a front side (a side of the display panel 11). Moreover, FIG. 6 are views showing a part corresponding to a region D1 of FIG. 5A, in which FIG. 6A is a plan view (top view), FIG. 6B is a view when viewed from a rear view, and FIG. 6C is a side view.

The bottom cover 20 is a resin-molded part extending right and left, which is attached to a lower-side part of the display panel 11, and is integrally configured by including a decoration exposure portion 21 which is partially exposed from the lower side of the display panel in a front view and a bottom base portion 22 which is hidden behind a rear surface of the display panel 11 of the decoration exposure portion 21.

The bottom base portion 22 is formed in an upper side of the decoration exposure portion 21, and further, at positions of two predetermined sites of an upper side of the bottom base portion 22, board attachment portions 26 for fixing a circuit board 27 and the like are provided. The board attachment portions 26 are formed in the rear side so as to be lower by one stage and formed so as to be at a position of a heat radiation plate 18 in a state of being attached to the backlight chassis 12, as shown in FIG. 1 and FIG. 2.

Furthermore, in the bottom base portion 22, SP bosses 30 with which the speaker unit 50 is attached are provided. Two of the SP bosses 30 form one set, and one set is provided for each of two regions in right and left, and is screw-fixed to SP fixation portions 53 of the speaker unit 50, which will be described below. More specifically, for example, as shown in a right-side region in the rear view of FIG. 6, one set of the SP bosses 30 is positioned almost slightly outer side in a right-and-left direction than positions where the board attachment portions 26 are formed, and is formed so as to have a predetermined length from the bottom base portion 22 perpendicularly to a rear direction thereof.

Moreover, in a boundary part between the decoration exposure portion 21 and the bottom base portion 22, a plurality of cover ribs 40 extending toward a frontward side, with which the bottom cover 20 is attached to the backlight chassis 12 (aluminum frame 14), are formed, and inserted into and fitted to the bottom cover attachment openings 70 as described above.

Figure 9A:
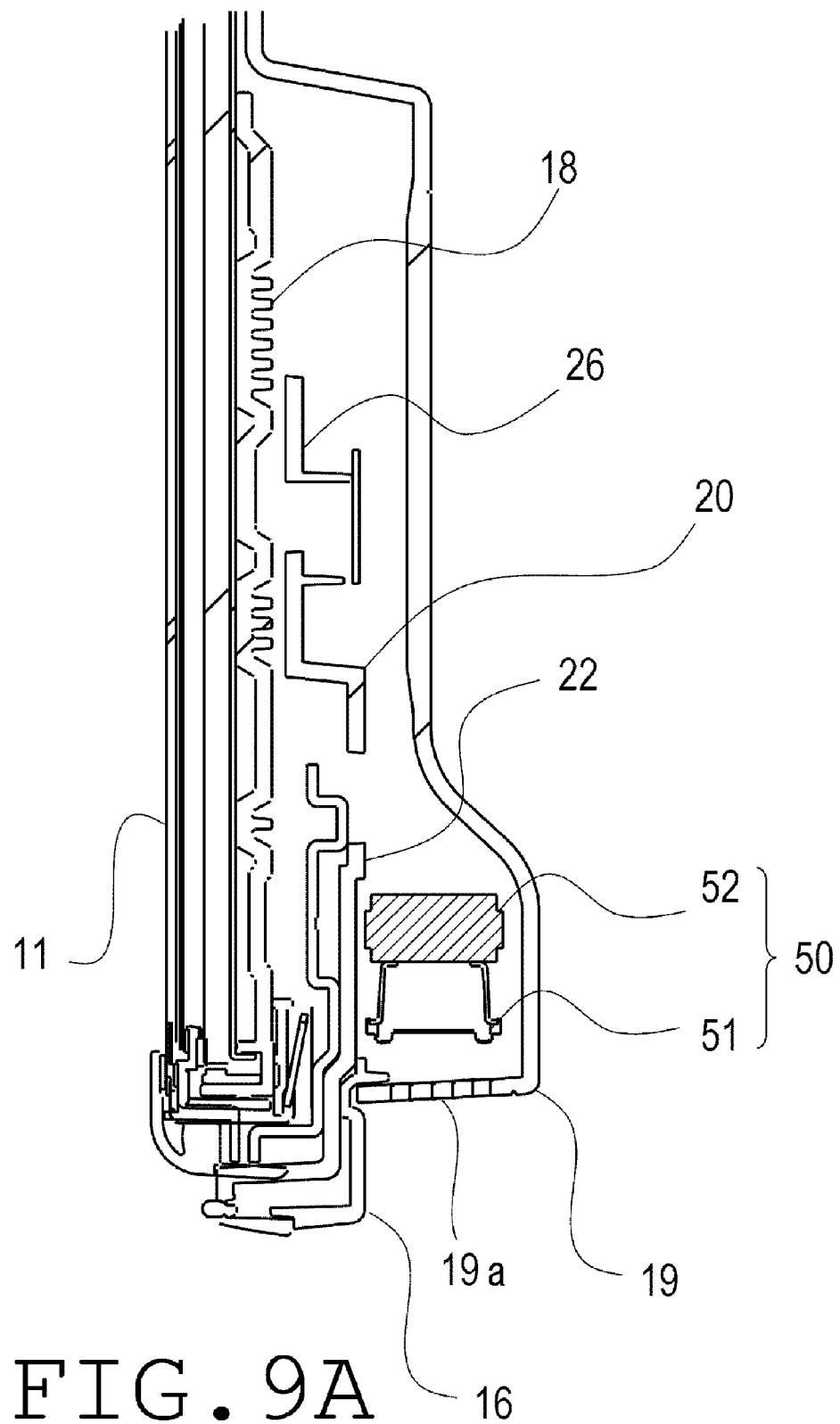
FIG. 9 show a structure of attachment of the speaker unit according to the first embodiment, which is a view schematically showing a region B1 of FIG. 3 by enlargement.

Moreover, in a center part in a right-and-left direction of the decoration exposure portion 21, a swelling portion 28 slightly swelling downward is formed. In the swelling portion 28, a remote control light receiving portion and the like are attached. In the decoration exposure portion 21, right and left regions other than the swelling portion 28 have substantially no widths in a vertical direction, and there is no space for attaching parts or the like to in a rear surface thereof. Note that, in a rear side of the decoration exposure portion 21, a rear bottom cover 16 which covers the rear side of the decoration exposure portion 21 is attached as shown in FIG. 9A described below.

Figure 7B:
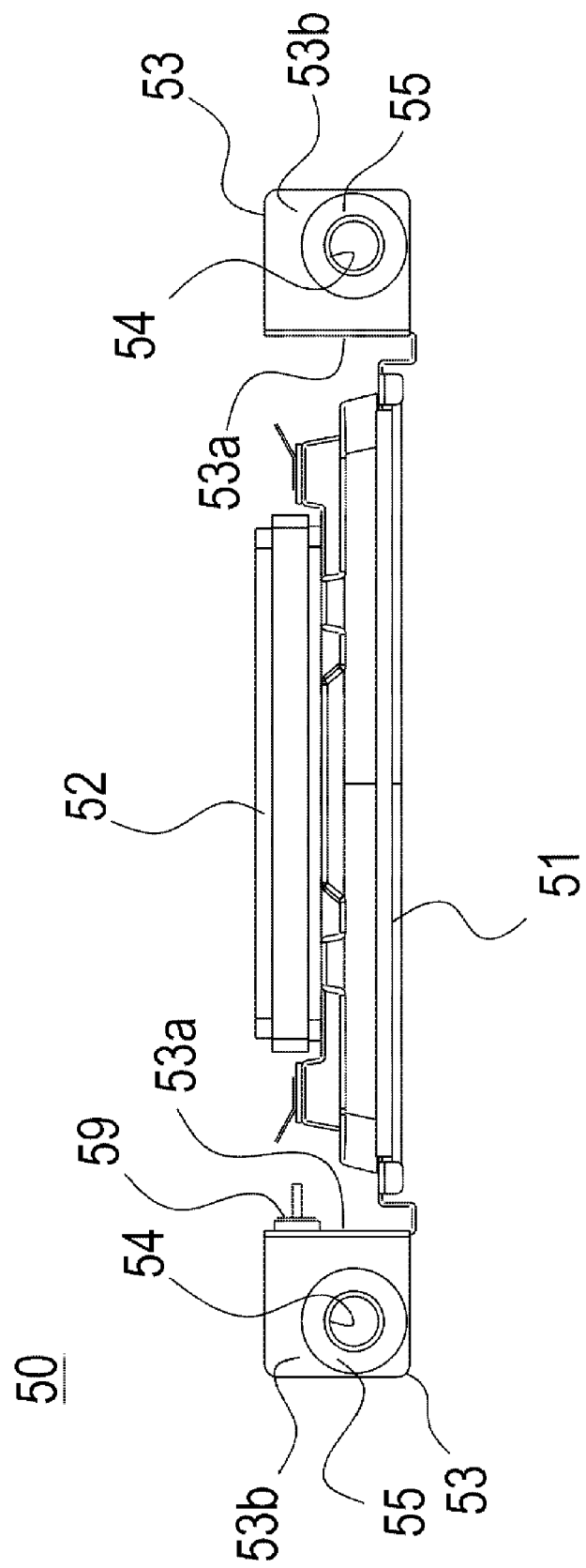
FIG. 7 are views showing a speaker unit according to the first embodiment.
Figure 7C:
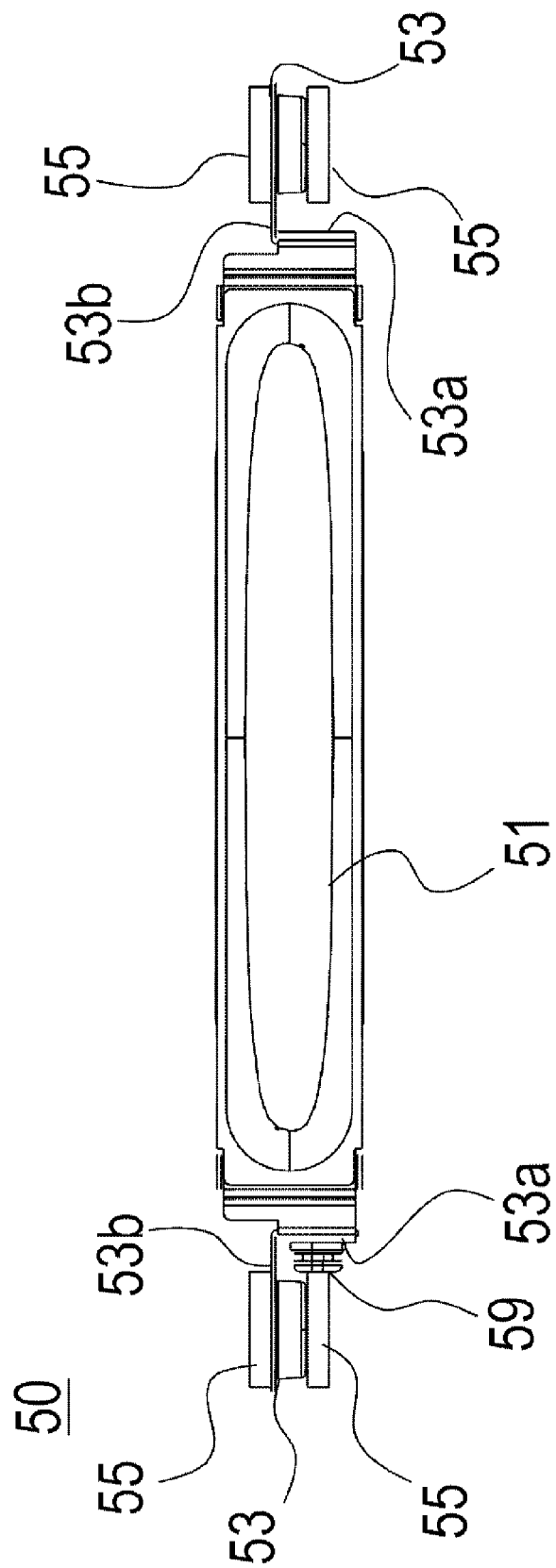
Figure 7D:
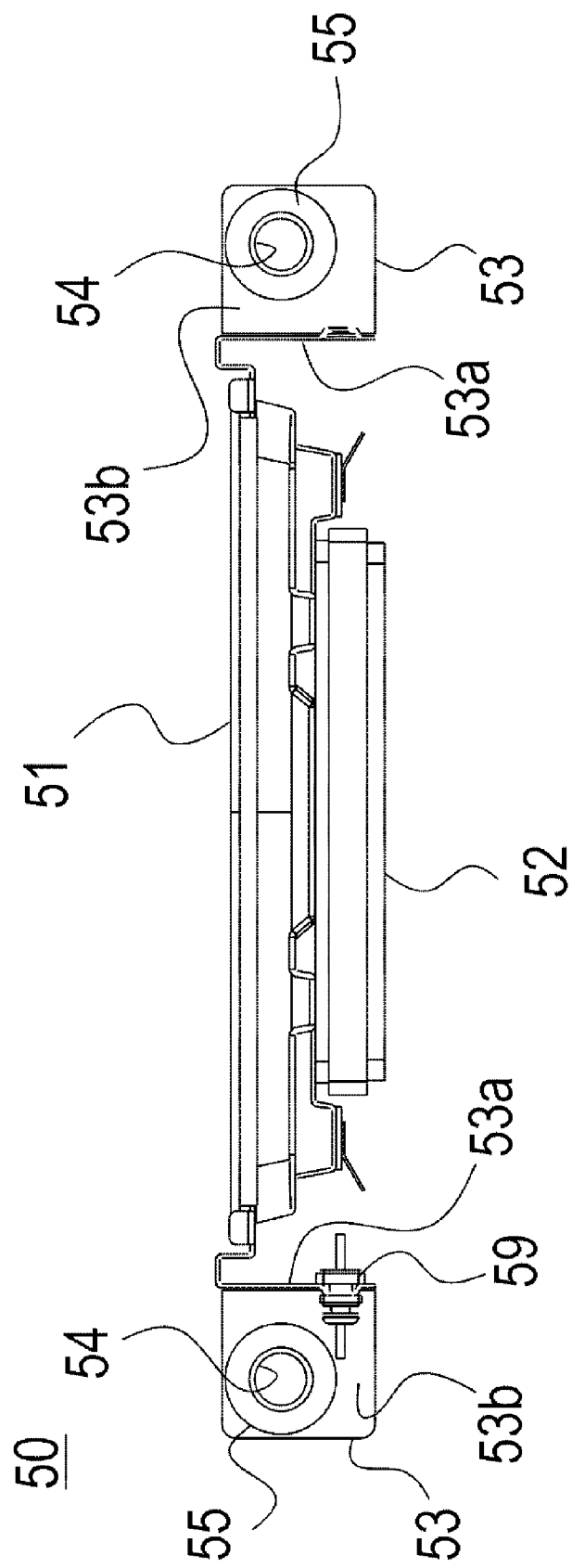
Figure 7E:
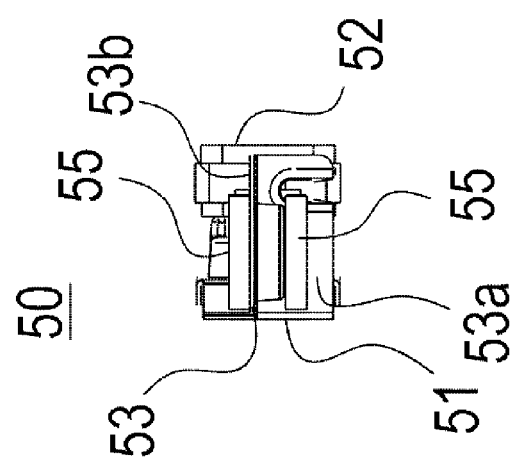

FIG. 7 are views showing the speaker unit 50, in which FIG. 7A is a perspective view, FIG. 7B is a front view, FIG. 7C is a bottom view, FIG. 7D is a rear view, and FIG. 7E is a side view.

As illustrated, the speaker unit 50 is formed so as to be symmetrical in back-and-forth and right-and-left directions in a state of being installed. Specifically, the speaker unit 50 includes a speaker main body 51 having a substantially rectangular external form, a magnetic circuit 52 provided in a side opposed to an output direction of the speaker main body 51 (upper side in FIG. 9B), and SP fixation portions 53 provided in each of ends in right and left in a longitudinal direction of the speaker main body 51. Here, the SP fixation portions 53 are set at positions which are higher than a center of gravity of the speaker unit 50, more specifically, a center of gravity of a configuration except the SP fixation portions 53. Thereby, the speaker unit 50 which faces downward stabilizes. Note that, the shape of the speaker unit 50 is not intended to be limited to the substantially rectangular external form, and may be a shape having a longitudinal direction and a lateral direction similarly to a rectangular shape (for example, elliptic shape).

The SP fixation portion 53 has a bent surface 53a that a metal plate of an external form part of the speaker main body 51 once bends to the magnetic circuit 52 side in a substantially U-shape from an output surface (output front end surface) of the speaker main body 51, and a fixation surface 53b which further bends to a right-and-left outer side direction. The bend surface 53a on one side is provided with a terminal 59. In a center of the fixation surface 53b of the SP fixation portion 53, a fixation hole 54 is formed. Moreover, in both surfaces of the fixation surface 53b, buffer materials 55 which have a ring shape whose inner diameter is slightly larger than the fixation hole 54 are arranged.

Then, by arranging the speaker unit 50 and anchoring with a screw 81 so as to cause the fixation hole 54 and a hole of the SP boss 30 to coincide, for example, as a figure of a state of attachment of the bottom cover 20 and the backlight chassis 12 shown in FIG. 8, the speaker unit 50 is fixed to the bottom cover 20.

Figure 9B:
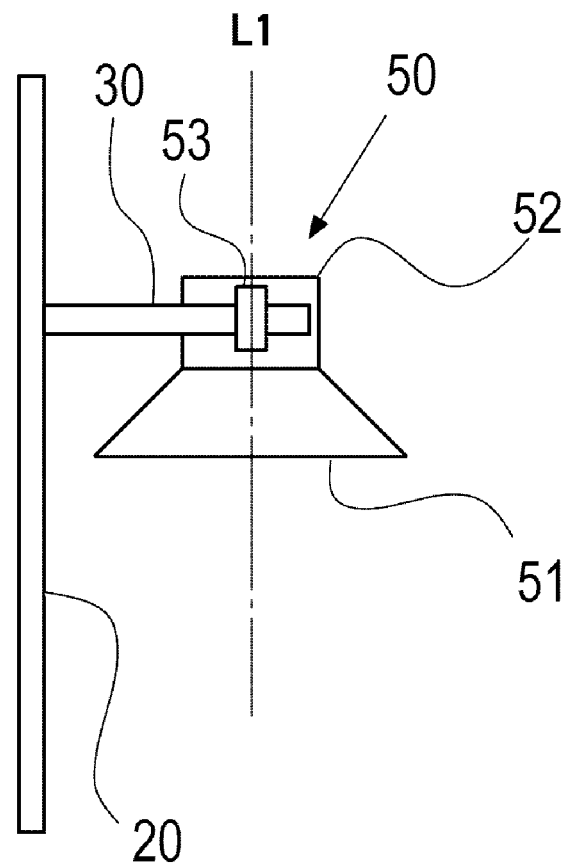

FIG. 9A shows a sectional view of a side surface of the liquid crystal television 10 by focusing on a state where the speaker unit 50 is attached (enlargement view of a region C1 of FIG. 3), and FIG. 9B schematically shows an attachment mode of the speaker unit 50.

As illustrated, in the bottom cover 20, the bottom base portion 22 which fixes the speaker unit 50 is arranged so as to be in a rear surface of the display portion 11 (backlight chassis 12). Further, the rear cover (rear cabinet) is provided so as to swell backward in a region where the speaker unit 50 is arranged and so as to cover up to an edge of the speaker main body 51 (sounding portion), that is, the speaker unit 50 completely. Furthermore, in a region of an output forward side of the speaker main body 51 of the rear cover 19, an opening for voice output 19a is formed.

Furthermore, the fixation hole 54 of the SP fixation portion 53 with which the speaker 50 is attached to the SP boss 30 of the bottom base portion 22 is substantially at a center of the speaker main body 51 (refer to a back-and-forth center position L1 of FIG. 9B). With such a configuration, an inclination due to a weight of the speaker unit 50 is not to be occurred at a time of installation.

As above, according to the present embodiment, in the liquid crystal television 10 having a narrow frame, it is possible to arrange the speaker unit 50 effectively. Moreover, by swelling the rear cover 19 with the speaker unit 50, it is possible to reduce a thickness at a place other than the region of the speaker unit 50. Moreover, the speaker unit 50 is to be a pseudo sealed portion, thus making it possible to improve sound quality. Further, a reflection plate or the like is not particularly arranged frontward of output of the speaker main body 51, thus making it possible to contribute to frame narrowing.

Second Embodiment

In order to realize a narrow frame of a flat-screen television, a technology for preventing increase in a frame dimension which results from attachment of a speaker unit or the like is necessary. Moreover, due to thinning of the speaker unit, there is a risk that shortage of strength is caused. In addition, due to a structure in which the speaker unit is arranged under a display portion, a user lifts the television by holding an under part of the speaker unit in many cases, so that a measure for strengthening for preventing deformation between the speaker unit and the display portion has been necessary.

As a technology for such a measure, for example, there is a technology which provides a reinforcing structure for a video device and a reinforcing structure for a cabinet capable of preventing corner parts of bosses formed so as to be projected at crossing sites of a plurality of lines of grating ribs provided to parts for supporting a cathode ray tube in the cabinet and ribs in a side which is contact with the cathode ray tube from causing a crack or breakage due to a shock by falling-off or the like and improving the strength at the corner parts (for example, refer to Japanese Laid-Open Patent Publication No. 2003-230075).

Meanwhile, by the technology disclosed in Japanese Laid-Open Patent Publication No. 2003-230075, it is possible to strengthen parts of the cabinet regarding a front portion with the ribs in a television set. However, it is possible to achieve increase in strength by disposing the ribs around the front of a display portion, but increase in strength between a speaker unit and the display portion in a lower portion of the front is insufficient, thus another technology has been required. Then, a technology of an embodiment described below will be proposed.

Figure 10:
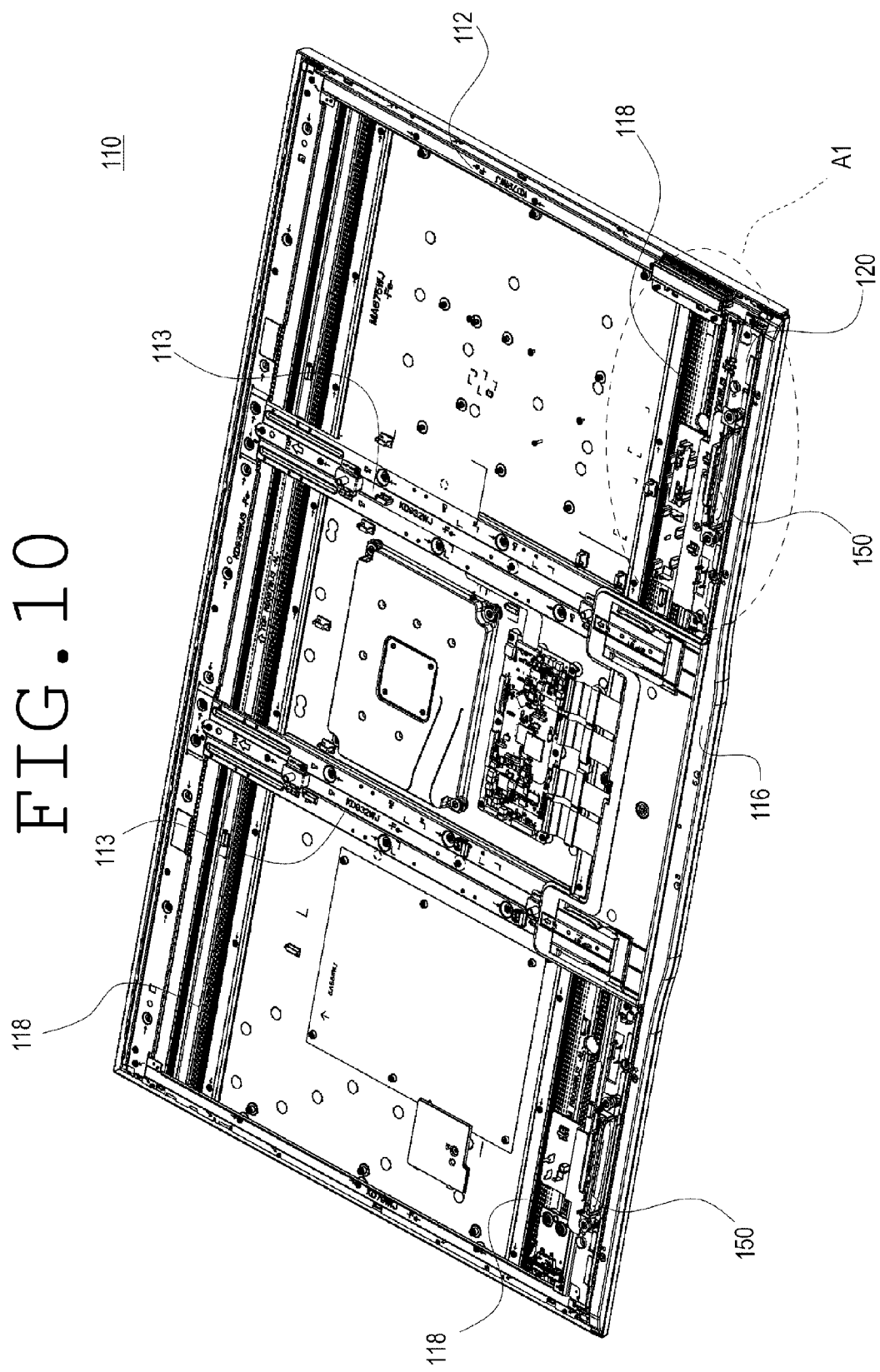
FIG. 10 is a perspective view of a rear surface of a liquid crystal television according to a second embodiment.
Figure 11:
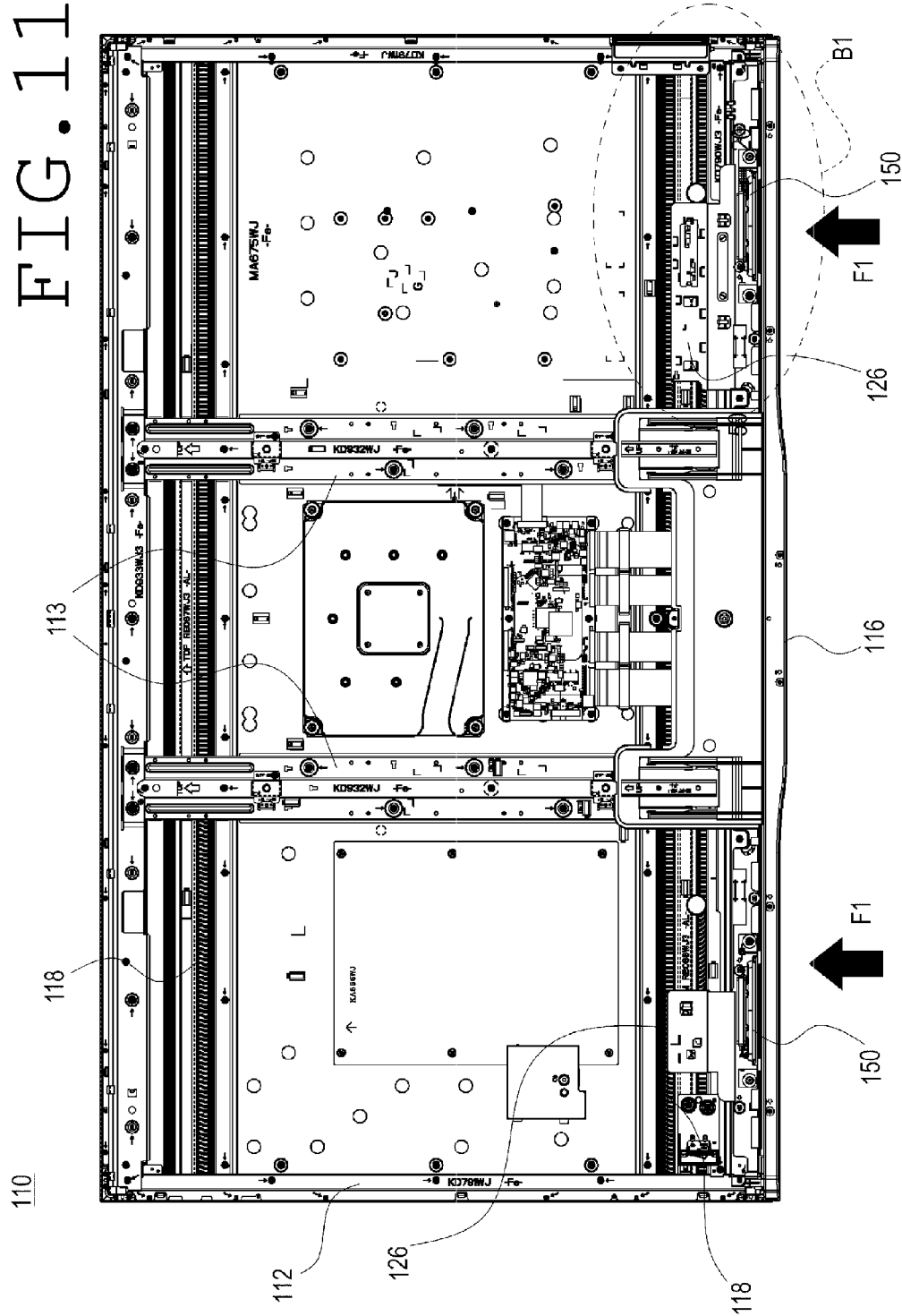
FIG. 11 is a view of the rear surface of the liquid crystal television according to the second embodiment.

FIG. 10 is a perspective view of a rear surface of a liquid crystal television 110 according to the present embodiment, and FIG. 11 is a view of the rear surface of the liquid crystal television 110. Note that, FIG. 10 and FIG. 11 show an inner structure so as to be recognizable by removing a rear cover 119. As illustrated, in the rear surface of the liquid crystal television 110, a backlight chassis 112 is exposed in a state where the rear cover 119 is detached, and two reinforcing angles 113 are arranged in a vertical direction.

Figure 12:
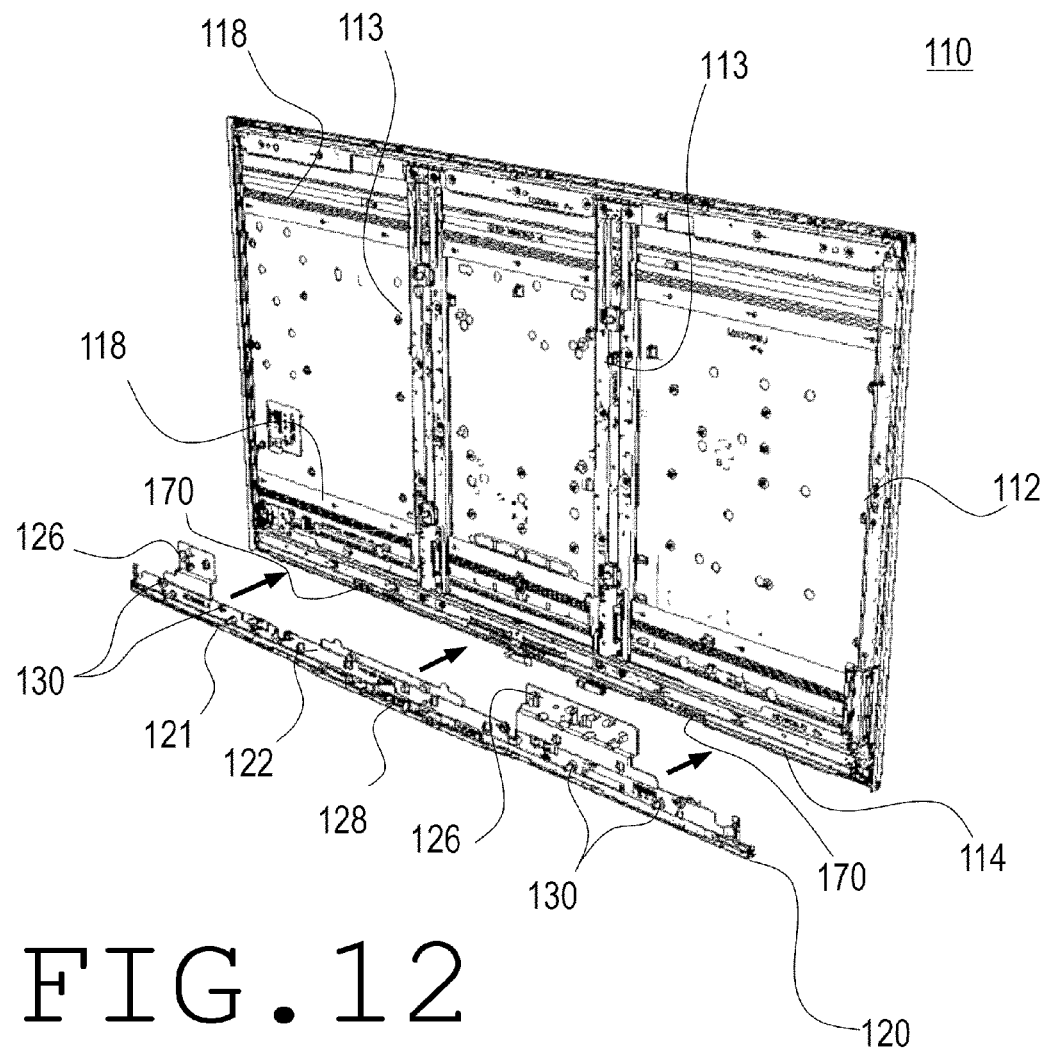
FIG. 12 is a perspective view showing the rear surface of the liquid crystal television with a backlight chassis and a bottom cover separated according to the second embodiment.

A perspective view of FIG. 12 shows the rear surface of the liquid crystal television 110 with the backlight chassis 112 and a bottom cover 120 separated. In this liquid crystal television 110, SP bosses 130 with which a speaker unit 150 is attached to the bottom cover 120 which also serves as an appearance part are provided. Moreover, as shown in FIG. 10 and FIG. 11, the speaker unit 150 is arranged onto the backlight chassis 112 (rear side). By adopting such a configuration, frame narrowing of the liquid crystal television 110 is realized.

Figure 13:
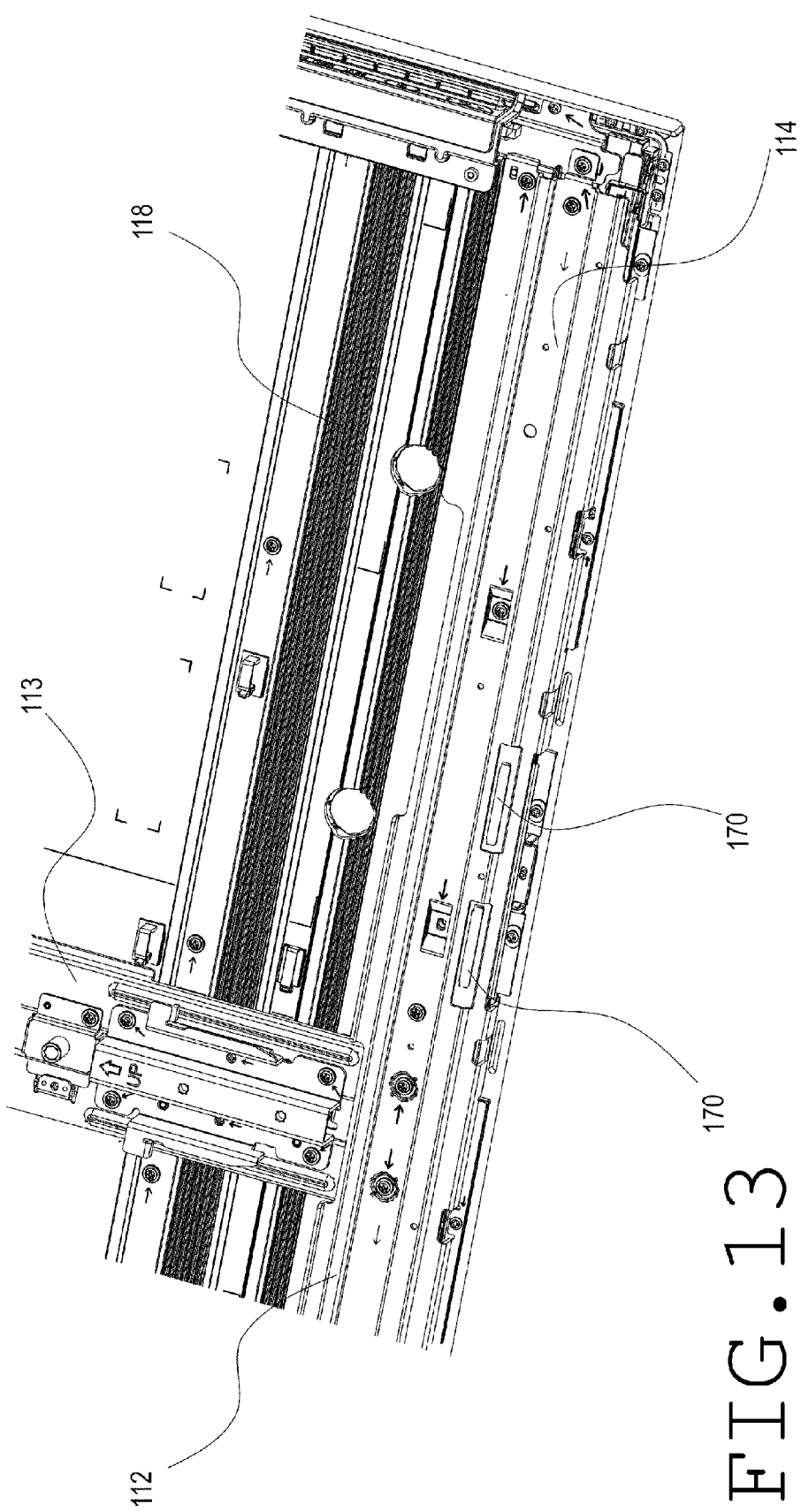
FIG. 13 is a partial enlargement perspective view of the backlight chassis of the liquid crystal television according to the second embodiment.

FIG. 13 shows a region of a lower right part of the backlight chassis 112 in a rear view (region corresponding to a region A1 of FIG. 10 and a region B1 of FIG. 11). The backlight chassis 112 includes an aluminum frame 114 as an outer frame structure of a display panel 111. Then, in a region of a lower side of the aluminum frame 114, bottom cover attachment openings 170 with which the bottom cover 120 is attached from the rear side are provided.

The bottom cover attachment openings 170 have a rectangular shape whose right-and-left direction serves as a longitudinal direction, and are arrayed in two pieces in each of right and left of the aluminum frame 114 to be formed in four pieces in total. Into the bottom cover attachment openings 170, cover ribs 140 of the bottom cover 120, which will be described below, are inserted. That is, the shape of the bottom cover attachment openings 170 is set so as to have a shape in accordance with a shape of the cover ribs 140.

Figure 14A:
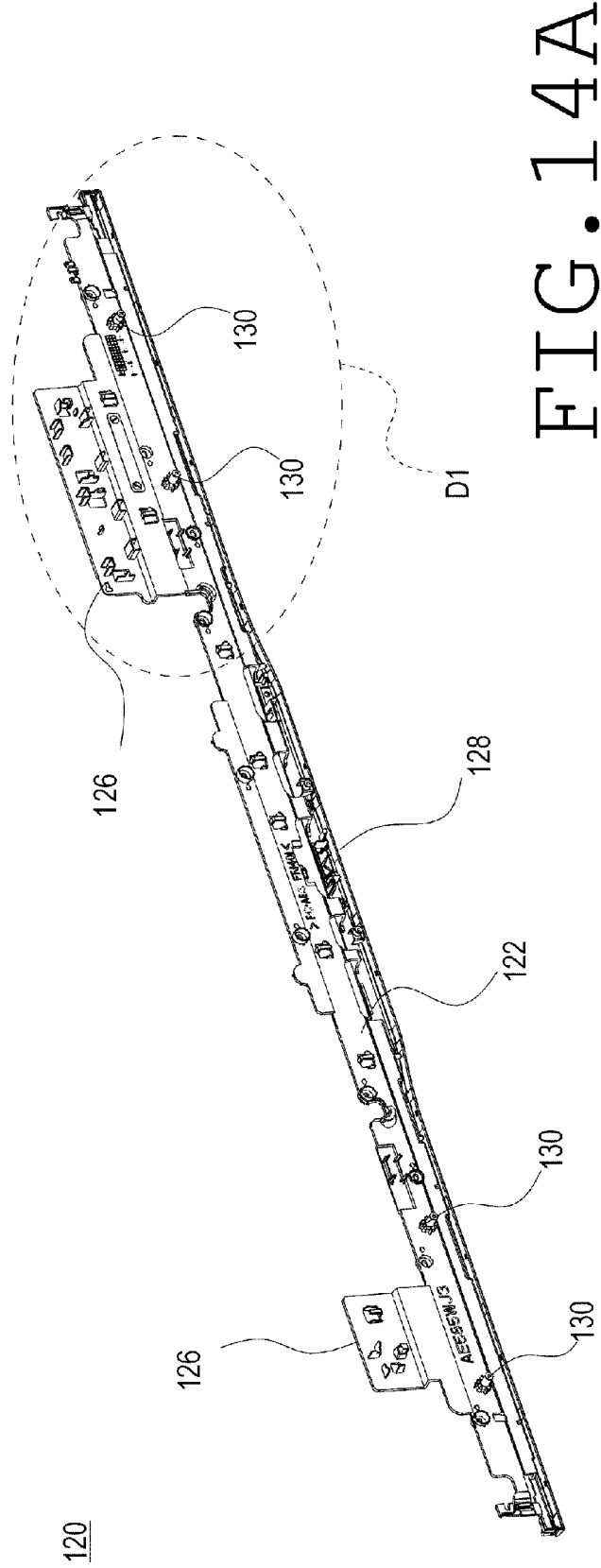
FIG. 14 are perspective views of the bottom cover according to the second embodiment.
Figure 14B:
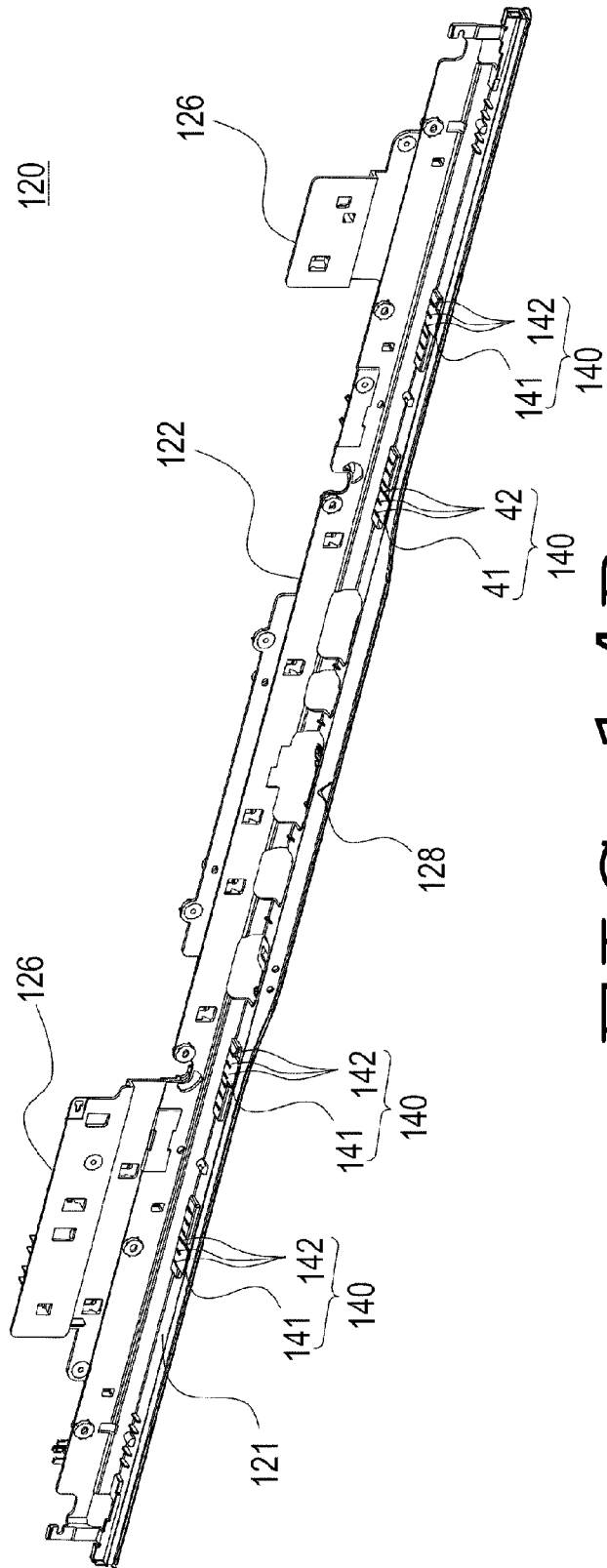
Figure 15A:
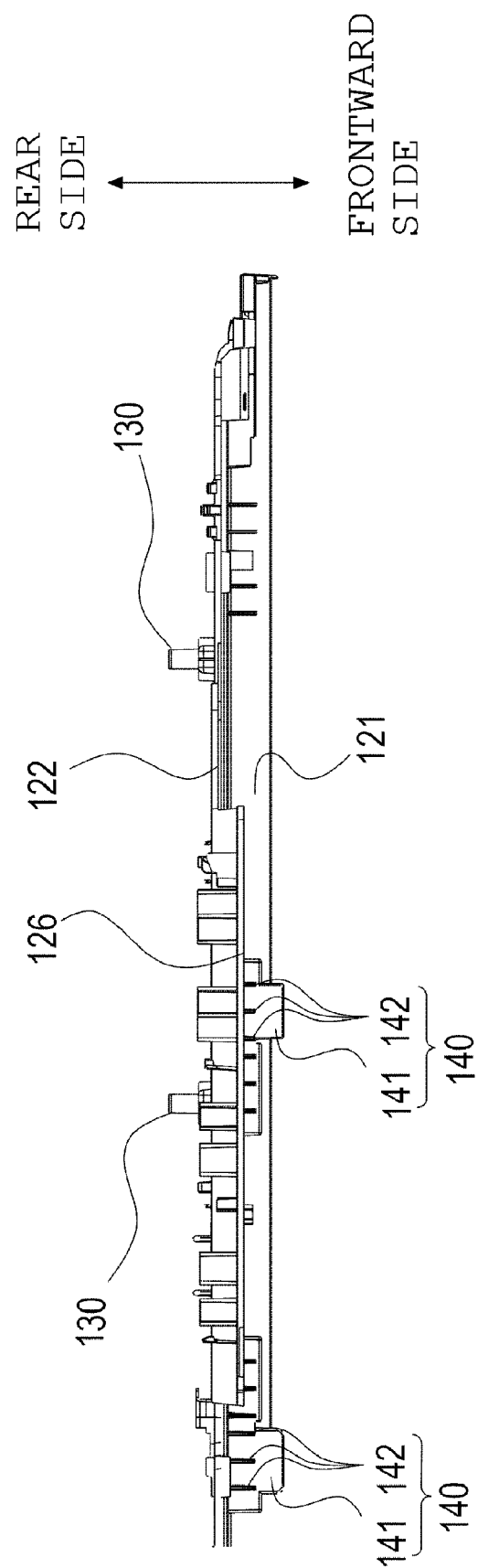
FIG. 15 are partial enlargement views of the bottom cover according to the second embodiment.
Figure 15B:
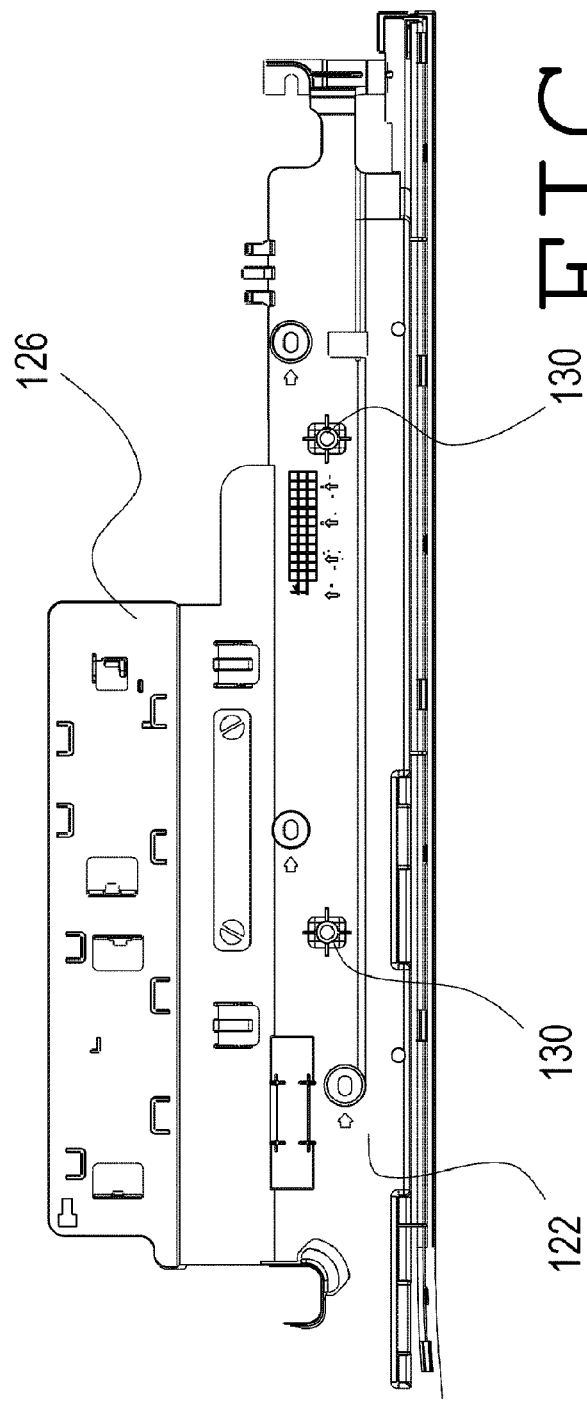

FIG. 14 are perspective views of the bottom cover 120, in which FIG. 14A is the perspective view when viewed from the rear side and FIG. 14B is the perspective view when viewed from a front side (a side of the display panel 11). Moreover, FIG. 15 are views showing a part corresponding to a region D1 of FIG. 14A, in which FIG. 15A is a plan view (top view), FIG. 15B is a view when viewed from a rear view, and FIG. 15C is a side view.

The bottom cover 120 is a resin-molded part extending right and left, which is attached to a lower-side part of the display panel 111, and is integrally configured by including a decoration exposure portion 121 which is partially exposed from the lower side of the display panel 111 in a front view and a bottom base portion 122 which is hidden behind a rear surface of the display panel 111 of the decoration exposure portion 121.

The bottom base portion 122 is formed in an upper side of the decoration exposure portion 121, and further, at positions of two predetermined sites of an upper side of the bottom base portion 122, board attachment portions 126 for fixing a circuit board 127 and the like are provided. The board attachment portions 126 are formed in the rear side so as to be lower by one stage and formed so as to be at a position of a heat radiation plate 118 in a state of being attached to the backlight chassis 112, as shown in FIG. 10 and FIG. 11.

Furthermore, in the bottom base portion 122, SP bosses 130 with which the speaker unit 150 is attached are provided. Two of the SP bosses 130 form one set, and one set is provided for each of two regions in right and left, and is screw-fixed to SP fixation portions 153 of the speaker unit 150, which will be described below. More specifically, for example, as shown in a right-side region in the rear view of FIG. 15, one set of the SP bosses 130 is positioned almost slightly outer side in a right-and-left direction than positions where the board attachment portions 126 are formed, and is formed so as to have a predetermined length from the bottom base portion 122 perpendicularly to a rear direction thereof.

Moreover, in a boundary part between the decoration exposure portion 121 and the bottom base portion 122, a plurality of cover ribs 140 extending toward a frontward side, with which the bottom cover 120 is attached to the backlight chassis 112 (aluminum frame 114), are formed, and inserted into and fitted to the bottom cover attachment openings 170 as described above.

More specifically, the cover rib 140 is provided with a flat plate rib 141 which has a horizontal plate shape, and reinforcing ribs 142 having a convex-shaped sectional surface, which are provided in a plurality of pieces in an upper side of a root part of the flat plate rib 141. A length of the reinforcing ribs 142 is shorter than a length of the flat plate rib 141, and formed so as to reach to, for example, about a quarter to a half of a depth of the bottom cover attachment openings 170, when the cover ribs 140 are inserted.

A width of the flat plate rib 141 is set so as to correspond to a width of the bottom cover attachment openings 170 into which the cover ribs 140 are inserted, and set to have a slightly short dimension. Moreover, a total of a thickness of the flat plate rib 141 and a height of the reinforcing ribs 142 is set so as to correspond to a height of the bottom cover attachment openings 170, and set to have a slightly short dimension similarly to the above. Note that, in the present embodiment, the reinforcing ribs 142 are provided only on a top surface of the flat plate ribs 141, but may be provided also in a bottom surface.

Moreover, in a center part in a right-and-left direction of the decoration exposure portion 121, a swelling portion 128 slightly swelling downward is formed. In the swelling portion 128, a remote control light receiving portion and the like are attached. In the decoration exposure portion 121, right and left regions other than the swelling portion 128 have substantially no widths in a vertical direction, and there is no space for attaching parts or the like to in a rear surface thereof.

Figure 16:
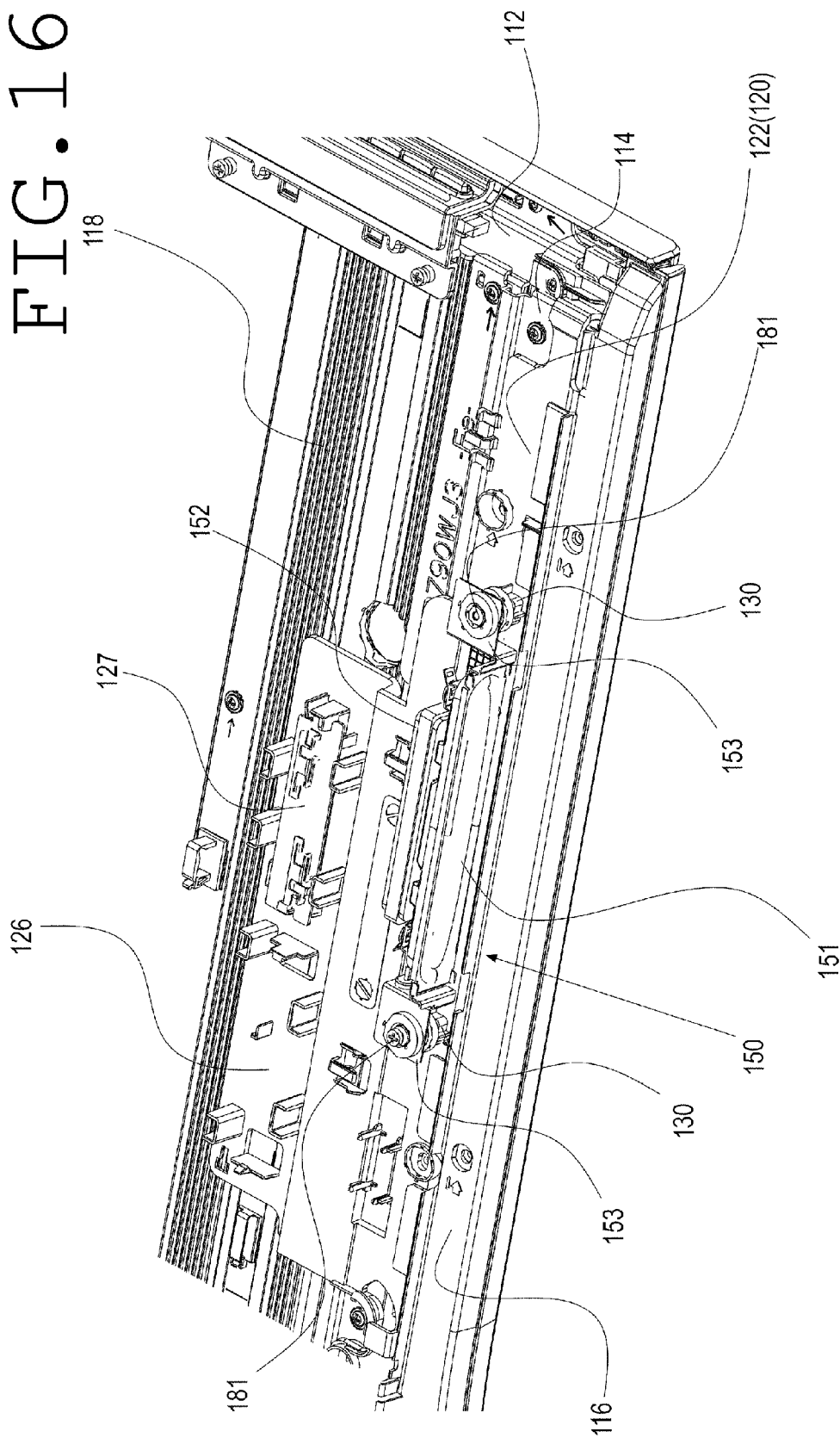
FIG. 16 shows a structure of attachment of the bottom cover according to the second embodiment, which is a view showing the region A1 of FIG. 1 by enlargement.
Figure 18A:
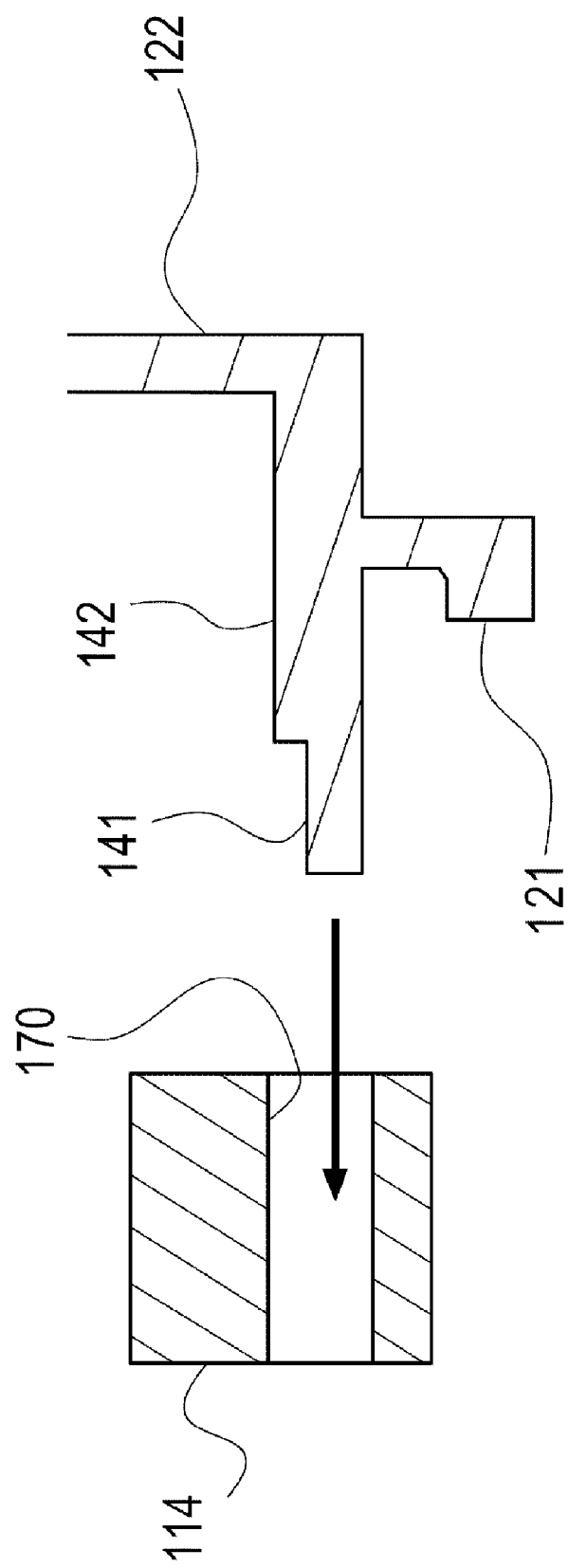
FIG. 18 are sectional views schematically showing the structure of connection of the cover rib of the bottom cover and the bottom cover attachment opening of the aluminum frame according to the second embodiment.

FIG. 16 shows a state where the bottom cover 120 and the backlight chassis 112 (aluminum frame 114) are attached. Moreover, FIG. 17 shows a sectional side view of the state where the bottom cover 120 and the backlight chassis 112 (aluminum frame 114) are attached. Furthermore, FIG. 18 schematically show procedure that the cover ribs 140 are caused to be inserted into and fitted to the bottom cover attachment openings 170 of the aluminum frame 114. FIG. 18A shows a state before the insertion, and FIG. 18B shows a state after the insertion.

By inserting the cover ribs 140 into the bottom cover attachment openings 170 and arranging the speaker unit 150 and anchoring with a screw 181 so as to cause the fixation hole 154 and a hole of the SP boss 130 to coincide, the speaker unit 150 is fixed to the bottom cover 120.

As illustrated, in the bottom cover 120, the bottom base portion 122 which fixes the speaker unit 150 is arranged so as to be in a rear surface of the display portion 111 (backlight chassis 112). Further, the rear cover 119 (rear cabinet) is provided so as to swell backward in a region where the speaker unit 150 is arranged and so as to cover up to an edge of the speaker main body 151 (sounding portion), that is, the speaker unit 150 completely.

Furthermore, in a region of an output forward side of the speaker main body 151 of the rear cover 119, an opening for voice output 119a is formed.

Here, fitting positions of the cover ribs 140 and the bottom cover attachment openings 170 are out of a region of the swelling portion 128. Therefore, in the case of grabbing the liquid crystal television 110 for installation, transportation or the like, a user or the like is to grab a position avoiding the swelling portion 128, that is, the fitting positions of the cover ribs 140 and the bottom cover attachment openings 170 or a position in a vicinity thereof. Accordingly, as the user performs a work by grabbing it, there is no possibility that the bottom cover 120 or the like comes off.

Particularly, in the case of performing a work by grabbing it, a force in a rotational direction cannot help acting on the grabbed position in some cases depending on a way of applying a force by the user. In this case, when the bottom cover 120 is fixed at a position separating from the grabbed position, a large rotational moment is to act at the grabbed position, so that there is a risk of coming off even with a little force.

However, in the present embodiment, as described above, the bottom cover 120 is fixed at the position to be grabbed or in the vicinity thereof, and positioning in a vertical direction is reliably performed by the reinforcing ribs 142 at the fitting positions in the bottom cover attachment openings 170. Therefore, even when a force from downward as shown with an arrow F1 of FIG. 18B acts, it is possible to effectively prevent the bottom cover 120 from coming off.

A summary of features of the second embodiment is as follows.

This flat-screen display device includes: a frame of an outer peripheral part of a display panel; a bottom cover arranged so as to cover a lower-side part of the display panel; a speaker attached to the bottom cover and arranged in a region of a rear surface of the display panel; an opening formed in a lower-side part in the frame; and a rib formed in the bottom cover and inserted into the opening.

Moreover, the rib may include a flat plate rib and a reinforcing rib formed in a convex shape in a root part of the flat plate rib, and a sum of a thickness of the flat plate rib and a height of the reinforcing rib may be set to be substantially equal to a height of the opening.

Moreover, the bottom cover may include a swelling part which swells downward in a substantially center part in a right-and-left direction in a part which is exposed in a lower side of the display panel, and the rib may be inserted into the opening in a region other than the swelling part.

As above, description has been given for the present invention based on the embodiments. These embodiments are only exemplary and those skilled in the art could understand that, by combining each of the components thereof, etc., various modifications are possible, and such modifications are also within the scope of the present invention.

REFERENCE SIGNS LIST 10, 110 liquid crystal television
11, 111 display panel
12, 112 backlight chassis
14, 114 aluminum frame
19, 119 rear cover (rear cabinet)
20, 120 bottom cover
21, 121 decoration exposure portion
22, 122 bottom base portion
30, 130 SP boss
50, 150 speaker unit
51, 151 speaker main body
53, 153 SP fixation portion
54, 154 fixation hole
140 cover rib
141 flat plate rib
142 reinforcing rib
170 bottom cover attachment opening

The invention claimed is:

1. A flat-screen display device, comprising:
   a bottom cover which is arranged so as to cover a lower-side part of a display panel; and
   a speaker which is attached to the bottom cover and which is arranged in a region of a rear surface of the display panel with an output direction thereof downward and outward, wherein
   the bottom cover includes
   a rear surface base portion which is arranged in the rear surface of the display panel and in which bosses with which the speaker is attached are formed
   the bosses of the bottom cover are formed in one set of two pieces with respect to one speaker to be attached so as to be perpendicular to the display panel, and
   in the speaker, a speaker main body is formed in a shape having a longitudinal direction and a lateral direction as well as fixation portions for fixing the bosses are formed in both ends in the longitudinal direction of the speaker main body and so as to be at a center position of the lateral direction.

2. The flat-screen display device according to claim 1, wherein
   the fixation portions are at higher positions than a center of gravity of the speaker.

3. The flat-screen display device according to claim 1, wherein
   a rear cabinet which covers the speaker is included.

4. The flat-screen display device according to claim 3, wherein
   the rear cabinet includes an opening for output of the speaker.

* * * * *